US011730079B2

United States Patent
Wilhelmi et al.

(10) Patent No.: US 11,730,079 B2
(45) Date of Patent: *Aug. 22, 2023

(54) PLANTER WITH HIGH SPEED SEED DELIVERY APPARATUS

(71) Applicant: Kinze Manufacturing, Inc., Williamsburg, IA (US)

(72) Inventors: Matthew Wilhelmi, Williamsburg, IA (US); Dustan Hahn, Tampa, FL (US); Philip Willis, Williamsburg, IA (US); Dean Martin, Williamsburg, IA (US); Dalton McDowell, Williamsburg, IA (US); Gary Newell, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 313 days.

This patent is subject to a terminal disclaimer.

(21) Appl. No.: 16/949,302

(22) Filed: Oct. 23, 2020

(65) Prior Publication Data

US 2021/0037699 A1    Feb. 11, 2021

Related U.S. Application Data

(63) Continuation of application No. 16/146,536, filed on Sep. 28, 2018, now Pat. No. 10,842,072.

(Continued)

(51) Int. Cl.
*A01C 7/20* (2006.01)
*A01C 7/16* (2006.01)
(Continued)

(52) U.S. Cl.
CPC ............... *A01C 7/20* (2013.01); *A01C 7/046* (2013.01); *A01C 7/126* (2013.01); *A01C 7/16* (2013.01)

(58) Field of Classification Search
CPC ........... A01C 7/20; A01C 7/046; A01C 7/126; A01C 7/16; A01C 7/00; A01C 7/044; A01C 7/042; A01C 7/04; A01C 7/12; A01C 7/08

See application file for complete search history.

(56) References Cited

U.S. PATENT DOCUMENTS

| 2,566,406 | A | 9/1951 | Dougherty |
| 2,960,258 | A | 11/1960 | Dodwell |

(Continued)

FOREIGN PATENT DOCUMENTS

| DE | 102013111356 A1 | 4/2015 |
| RU | 2529317 C2 | 9/2014 |
| WO | 2015031840 A1 | 3/2015 |

OTHER PUBLICATIONS

Kinze Manufacturing, Inc., PCT/US2018/053479 filed Sep. 28, 2018, "The International Search Report and the Written Opinion of the International Searching Authority, or the Declaration", 17 pages, dated Nov. 30, 2018.

*Primary Examiner* — Christopher J. Novosad
(74) *Attorney, Agent, or Firm* — McKee, Voorhees & Sease, PLC

(57) ABSTRACT

An agricultural planting implement includes a number of row units. The row units include one or more seed meters for receiving, singulating, and dispensing seed to the ground such that preferred spacing of subsequent seed is attained. A seed meter provides seeds one at time to a seed carrier, such as a brush wheel. The brush wheel may move the seeds one at a time to a seed conveyor by directly moving seeds along a curved portion of a seed disc in the seed meter. The seed conveyor may be a flighted belt, and the velocity of the seeds when transferred from the seed carrier may match the velocity of the flighted belt. The seed conveyor conveys the seeds to a position near the bottom of a furrow, and ejects the (Continued)

seeds with little or no horizontal velocity relative to the bottom of the furrow.

17 Claims, 37 Drawing Sheets

Related U.S. Application Data

(60) Provisional application No. 62/596,350, filed on Dec. 8, 2017, provisional application No. 62/565,881, filed on Sep. 29, 2017.

(51) Int. Cl.
*A01C 7/12* (2006.01)
*A01C 7/04* (2006.01)

(56) References Cited

U.S. PATENT DOCUMENTS

| | | |
|---|---|---|
| 3,176,636 A | 4/1965 | Wilcox et al. |
| 4,023,509 A | 5/1977 | Hanson |
| 4,029,235 A | 6/1977 | Grataloup |
| 4,162,744 A | 7/1979 | Barker et al. |
| 4,664,290 A | 5/1987 | Martin et al. |
| 6,651,570 B1 | 11/2003 | Thiemke |
| 6,681,706 B2 | 1/2004 | Sauder et al. |
| 7,185,596 B2 | 3/2007 | Thiemke et al. |
| 7,343,868 B2 | 3/2008 | Stephens et al. |
| 7,631,606 B2 | 12/2009 | Sauder et al. |
| 8,074,586 B2 | 12/2011 | Garner et al. |
| 8,468,960 B2 | 6/2013 | Garner et al. |
| 8,543,238 B2 | 9/2013 | Straeter |
| 8,746,159 B2 | 6/2014 | Garner et al. |
| 8,789,482 B2 | 7/2014 | Garner et al. |
| 8,800,457 B2 | 8/2014 | Garner et al. |
| 8,813,663 B2 | 8/2014 | Garner et al. |
| 8,850,995 B2 | 10/2014 | Garner et al. |
| 8,850,998 B2 | 10/2014 | Garner et al. |
| 8,985,037 B2 | 3/2015 | Radtke et al. |
| 9,332,689 B2 | 5/2016 | Baurer et al. |
| 9,480,199 B2 | 11/2016 | Garner et al. |
| 9,510,502 B2 | 12/2016 | Garner et al. |
| 9,578,802 B2 | 2/2017 | Radtke et al. |
| 9,633,491 B2 | 4/2017 | Wonderlich |
| 9,635,802 B2 | 5/2017 | Rains et al. |
| 9,635,804 B2 | 5/2017 | Carr et al. |
| 9,661,799 B2 | 5/2017 | Garner et al. |
| 9,686,905 B2 | 6/2017 | Garner et al. |
| 9,686,906 B2 | 6/2017 | Garner et al. |
| 9,699,955 B2 | 7/2017 | Garner et al. |
| 9,750,178 B2 | 9/2017 | Kinzenbaw et al. |
| 9,756,779 B2 | 9/2017 | Wilhelmi et al. |
| 9,769,978 B2 | 9/2017 | Radtke |
| 9,801,328 B2 | 10/2017 | Garner et al. |
| 9,807,924 B2 | 11/2017 | Garner et al. |
| 9,820,429 B2 | 11/2017 | Garner et al. |
| 9,861,025 B2 | 1/2018 | Schaefer et al. |
| 9,861,031 B2 | 1/2018 | Garner et al. |
| 9,872,424 B2 | 1/2018 | Baurer et al. |
| 9,883,625 B2 | 2/2018 | Koch et al. |
| 9,897,922 B2 | 2/2018 | Enomoto et al. |
| 9,936,625 B2 | 4/2018 | Wendte et al. |
| 9,949,426 B2 | 4/2018 | Radtke et al. |
| 9,999,175 B2 | 6/2018 | Baurer et al. |
| 10,842,072 B2 * | 11/2020 | Wilhelmi ................ A01C 7/20 |
| 2007/0107645 A1 | 5/2007 | Mariman et al. |
| 2012/0067261 A1 | 3/2012 | Garner et al. |
| 2012/0240838 A1 | 9/2012 | Garner et al. |
| 2013/0192504 A1 | 8/2013 | Sauder et al. |
| 2016/0128273 A1 | 5/2016 | Garner et al. |
| 2016/0135363 A1 | 5/2016 | Sauder et al. |
| 2016/0234996 A1 | 8/2016 | Sauder et al. |
| 2017/0127604 A1 | 5/2017 | Wilhelmi et al. |
| 2017/0332546 A1 | 11/2017 | Garner et al. |
| 2017/0359949 A1 | 12/2017 | Garner et al. |
| 2018/0007824 A1 | 1/2018 | Radtke |

* cited by examiner

PLANTER WITH HIGH SPEED SEED DELIVERY APPARATUS

CROSS-REFERENCE TO RELATED APPLICATIONS

This application is a Continuation Application of U.S. Ser. No. 16/146,536, filed on Sep. 28, 2018, which claims priority under 35 U.S.C. § 119 to provisional application U.S. Ser. Nos. 62/565,881, filed Sep. 29, 2017, and 62/596,350, filed on Dec. 8, 2017. The priority patent applications are herein incorporated by reference in their entirety, including without limitation, the specification, claims, and abstract, as well as any figures, tables, appendices, or drawings thereof.

FIELD OF THE INVENTION

The present invention relates generally to agricultural implements. More particularly, but not exclusively, the invention relates to an agricultural planter with a seed delivery apparatus for delivering seed from a metering system of a row unit to a furrow created in the ground.

BACKGROUND OF THE INVENTION

An agricultural row crop planter is a machine built for distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing and a seed disc. The housing is constructed such that it creates a reservoir to hold a seed pool. The seed disc resides within the housing and rotates about a generally horizontal central axis. As the seed disc rotates, it passes through the seed pool where it picks up individual seeds. The seeds are subsequently dispensed from the seed meter and transported to the seed furrow.

Seed spacing in the seed furrow is roughly controlled by varying the rotational speed of the seed disc. The most common seed delivery system for delivering seed from the seed disc to the furrow may be categorized as a gravity drop system. In the case of the gravity drop system, a seed tube has an inlet end, which is positioned below the seed metering system. The singulated seeds from the seed metering system drop into the seed tube and fall via gravitational force from a discharge end thereof into the seed furrow. Monitoring systems are commonly used to monitor the operation of the planter. Such systems typically employ a seed sensor attached to each seed tube to detect the passage of seed therethrough.

However, such a gravity system can affect the seed spacing of the planter. For example, as the spacing of the speed is dependent on the rotational velocity of the seed disc and the gravitational constant, interruptions, forces, or other occurrences acting on the seed can greatly affect the spacing. For example, if the seed bumps against a wall of the seed tube on the way to the furrow; this can cause a delay or a non-vertical fall of the seed. If a preceding or following seed does not experience the same interruption, the seeds could be spaced too close or far from one another.

Furthermore, as the speed of planting increases, this causes additional problems. Drawing a planting implement through the field at faster speeds increases the speed of deposited seeds relative to the ground, causing seeds to roll and bounce upon landing in the trench or furrow and resulting in inconsistent plant spacing. The adverse agronomic effects of poor seed placement and inconsistent plant spacing are well known in the art.

Therefore, there is a need in the art for an agricultural planting implement that includes a seed delivery apparatus that aids in delivering seed from a singulating seed meter to a furrow or trench in the field, such that the spacing of adjacent seed is more consistent to increase the yield obtained of the end crop.

SUMMARY OF THE INVENTION

Therefore, it is a principal object, feature, and/or advantage of the disclosed features to overcome the deficiencies in the art.

It is another object, feature, and/or advantage of the disclosed features to provide an agricultural planter with a seed delivery apparatus to provide consistent spacing between adjacent seed.

It is yet another object, feature, and/or advantage of the disclosed features to provide a seed delivery apparatus, mechanism, and/or assembly that will deliver a seed from a seed metering device to the field.

It is still another object, feature, and/or advantage of the disclosed features to provide a seed delivery apparatus that will provide optimized spacing in a seed furrow.

It is a further object, feature, and/or advantage of the disclosed features to provide a seed delivery apparatus that will allow for planting with increased speed.

It is still a further object, feature, and/or advantage of the disclosed features to provide a seed delivery apparatus that provides for seed spacing that will not be influenced by abrupt forces during travel.

It is yet another object, feature, and/or advantage of the disclosed features to provide a controlled delivery of seed from a seed meter to the ground wherein a seed experiences near zero horizontal velocity relative to the ground, regardless of the velocity of the planter.

These and/or other objects, features, and advantages of the disclosure will be apparent to those skilled in the art. The present invention is not to be limited to or by these objects, features and advantages. No single embodiment need provide each and every object, feature, or advantage.

The disclosure relates to various seed delivery systems for providing a desired, equidistant spacing of seed in a field, regardless of the speed of travel of an agricultural planter. Some aspects of the systems can include that the delivery of the seed from a seed meter to a trench or furrow in the ground will not be influenced by factors such as external forces, including the free fall of gravity. Furthermore, at least some of the systems provide setups that provide that the seed will be release with substantially zero relative velocity such that the seed will land softly within a trench or furrow, and will have little to no bounce therein, which will aid in the correct spacing of the seed.

The disclosure, among other things, relates to a row unit for use with an agricultural implement that includes at least one seed meter having a seed disc. The seed meter has an opening and is adapted to provide one seed at a time to the seed meter opening. A rotating brush in communication with the seed meter opening receives seeds from the seed meter. A conveyor in communication with the rotating brush receives seeds from the rotating brush and the seeds proximate to the ground with a horizontal velocity component near zero relative to the ground. The row unit may include a second seed meter that has a second seed disc. The seed disc may rotate about a seed disc axis that is generally aligned with a direction of travel for the row unit. The rotating brush may rotate about a brush axis that is generally horizontal and transverse to the seed disc axis. The brush axis may be generally perpendicular to the seed disc axis. The row unit may include a comb in engagement with the rotating brush proximate to the conveyor to guide the seeds out of the rotating brush onto the conveyor. The conveyor may have a flighted belt within a conveyor cover. Movement of the flighted belt may be synchronized with a rotation speed of the rotating brush whereby seed exits the rotating brush with a velocity that closely matches the movement of the flighted belt. The seed meters may include a vacuum channel aligned beneath slots on the seed disc for retaining seed on the seed disc, and the vacuum channel may follow a path that moves the seeds radially outwardly on the slots towards the seed meter opening as the seed disc rotates.

The disclosure also relates to an agricultural planting implement that includes a plurality of row units. Each row unit of the plurality includes a seed meter with a seed exit, a seed carrier in communication with the seed exit for receiving seed from the seed meter one seed a time; and a seed conveyor in communication with the seed carrier to receive seeds from the seed carrier one at a time at a transfer location remote from the seed meter. The seed conveyor is adapted to move the seed from the transfer location to an ejection location proximate to the bottom of a furrow and is adapted to eject the seed with little or no horizontal velocity relative to the bottom of the furrow. The seed carrier may be a brush wheel. The seed carrier is adapted to release the seeds one at a time at the transfer location with a transfer velocity that closely matches a velocity of the seed conveyor. The seed conveyor may include a flighted belt.

According to another feature the disclosure relates to a row unit for use with an agricultural implement that has a seed meter. The seed meter has a seed disc that rotates about a seed disc axis. The seed meter has an opening. The seed disc has a front face and a rear face. The front face includes a flat inner portion and a curved outer portion that extends frontwardly from an outer edge of the flat inner portion. An array of apertures is provided in the flat inner portion of the seed disc in a circular pattern spaced radially inwardly from the curved outer portion. Each of the apertures in the array is adapted to retain a single seed. A rotating wheel rotates about a wheel axis. The rotating wheel is located such that an outer portion of the wheel matches and is in close engagement with the curved outer portion of the front face of the seed disc such that as the seed disc rotates it brings a seed retained on one of the apertures into engagement with the outer portion of the wheel whereby the rotating wheel moves the seed outwardly along the curved outer portion to the opening in the seed meter. A conveyor in communication with the opening in the seed meter to receive seeds from the rotating wheel, the conveyor ejecting the seeds proximate to the ground with a horizontal velocity component near zero relative to the ground. The rotating wheel may include a brush. The seed disc axis may be generally aligned with a direction of travel for the row unit. The wheel axis may be generally transverse to the seed disc axis. The brush axis may be generally perpendicular to the seed disc axis. The conveyor may include a flighted belt within a conveyor cover. The flighted belt is synchronized with rotation speed of the rotating brush whereby seed exits the rotating brush with a velocity that closely matches the movement of the flighted belt. The seed meter may include a rear cover facing that covers the rear face of the seed disc and a vacuum source for supplying a vacuum between the rear face and the rear cover to help retain the seeds in contact with the apertures as the seed disc rotates. The row unit may have a gasket that forms an airtight seal between the rear cover and an outer portion of the seed disc, whereby the seed disk rotates relative to the gasket. The gasket may include a leg that extends along the outer wall, such that relative movement of the seed disc and the rear cover towards and away from each other will not break the airtight seal.

Figure 1:
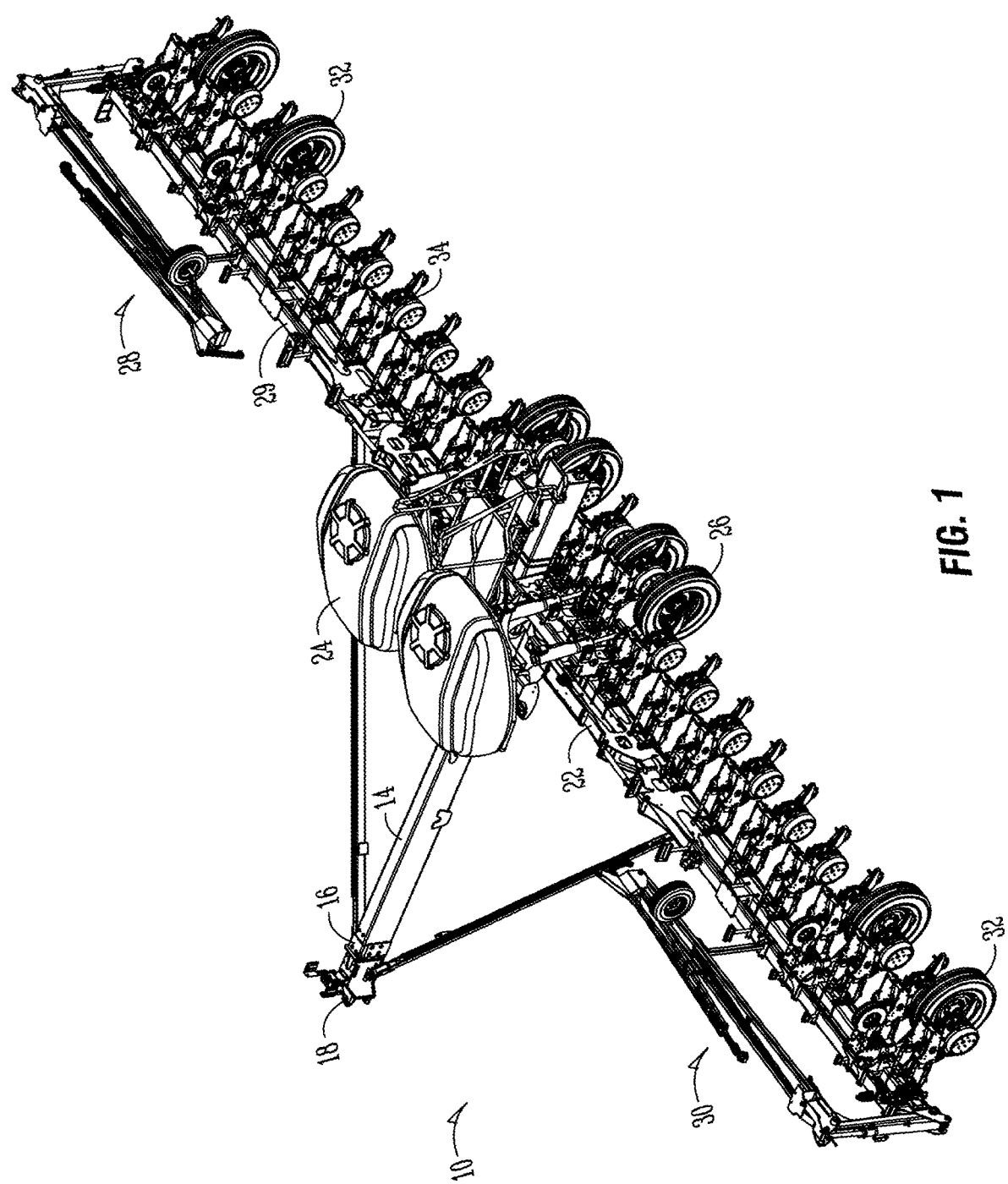
FIG. 1 is a perspective view of a planting implement according to one embodiment described in the disclosure.

Various embodiments of a seed delivery system and related components are described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE EMBODIMENTS

FIG. 1 shows an agricultural implement 10, in this case, an agricultural planter. The planter 10 is usually attached to and pulled by a tractor. However, it should be appreciated that other equipment and/or vehicles may move the implement 10. For purposes of the present disclosure, the implement 10 will be referred to as a planter.

The planter 10 includes a tongue 14 having a first end 16 and an opposite second end (not shown). The tongue 14 includes a hitch 18 at the first end 16, with the hitch 18 being connected to the tractor. At the opposite end of the tongue 14 is a central tool bar 22. The tongue 14 may be a telescoping tongue with components capable of being inserted into one another such that the implement 10 is a front folding style implement. However, the present invention is not to be limited to such front folding style implements and is to include any such implement for use in the agricultural industry.

Figure 3:
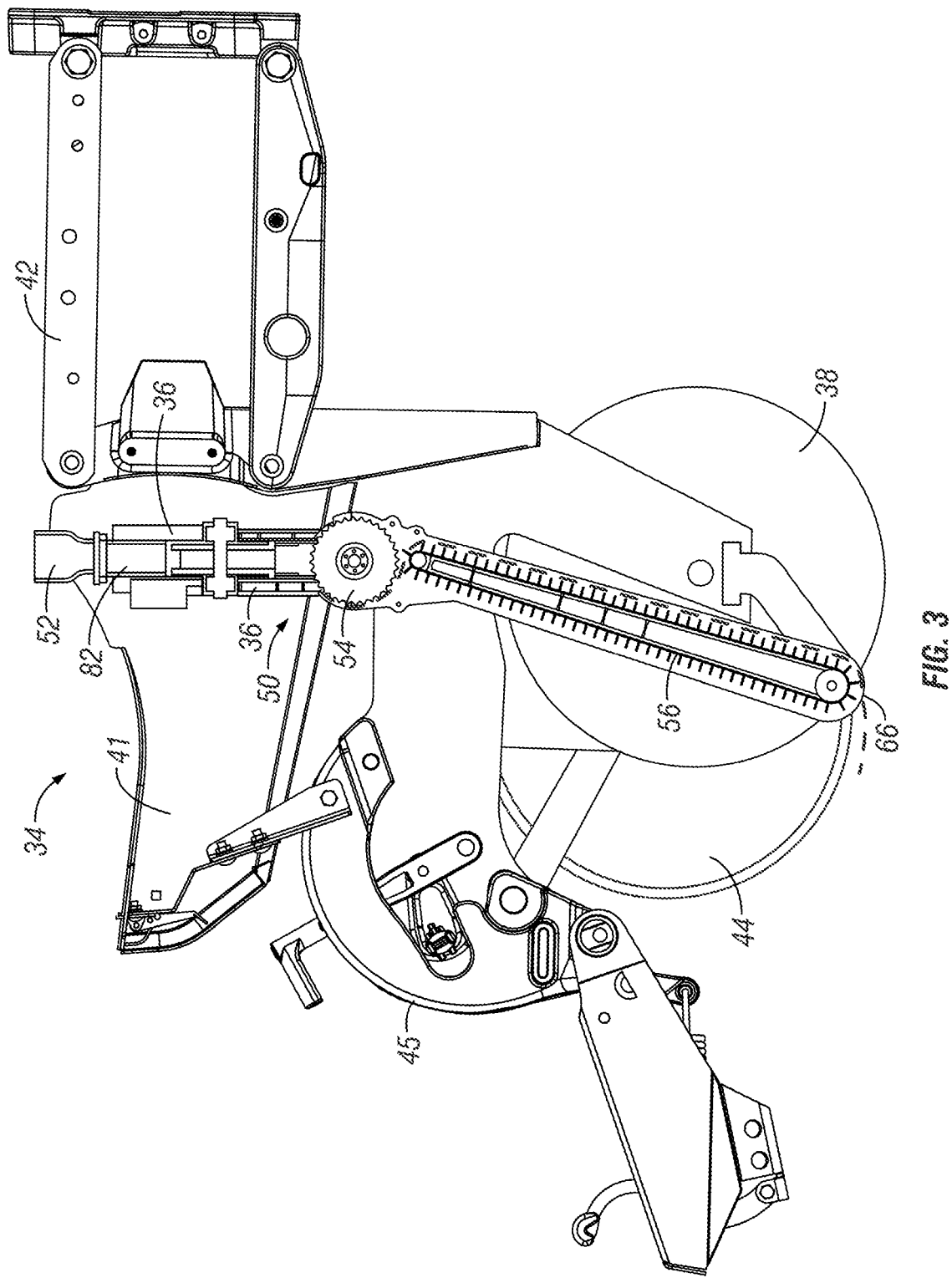
FIG. 3 is a side elevation view of a row unit including a dual seed meter and seed delivery system according to the present disclosure.

As shown in FIG. 1, central hoppers 24 are positioned at the central toolbar 22. The hoppers 24 are configured to store seed, fertilizer, insecticide, or other types of material for use in farming. The hoppers 24 may both contain the same material, or could contain separate materials. The use of the central hoppers 24 allows for a large amount of material to be added and stored at a centralized location. However, the invention also contemplates the use of one or more hoppers positioned at each of the row units 34 for providing seed to be planted at the row units, as is shown in FIG. 3. When central hoppers 24 are used at the central toolbar 22, it should be appreciated that the central hoppers will be in fluid communication with each of the row units 34. This can be done by use of separate hoses to each of the row units, or fewer hoses that include splitters, wherein the hose is split to provide seed or other material to more than one row unit. Also connected to the central toolbar is a plurality of central wheels, which may be known as transport wheels 26 extending generally downwardly from the central toolbar 22. The wheels 26 contact the ground and support the central hoppers 24. The wheels stabilize the implement 10 and are the wheels that contact the ground when in a working position or a transport position, e.g., if the implement 10 is a front folding implement such that the wings 28, 30 are folded forward with wing wheels 32 not contacting the ground.

Extending generally from both sides of the toolbar 22 are first and second wings 28, 30. The wings 28, 30 are generally identical and mirror images of one another. Therefore, only one wing will be described with the understanding that the other wing will be generally the same configuration. The first wing 28 includes a bar 29. Mounted to the bar 29 are a plurality of row units 34, as well as a plurality of wheels 32. The wheels 32 are configured to contact the ground. The row units 34 may be seeders, fertilizers, insecticide sprayers, or other dispensers, discs, or plows. The wings 28, 30 may also include at least one fold cylinder and a down force cylinder. It is further contemplated that multiple down force cylinders be used with an implement having more sections. The fold cylinder(s) is configured to fold the wings to a position wherein the first and second wings 28, 30 are generally adjacent the tongue 14 of the implement 10.

Figure 2:
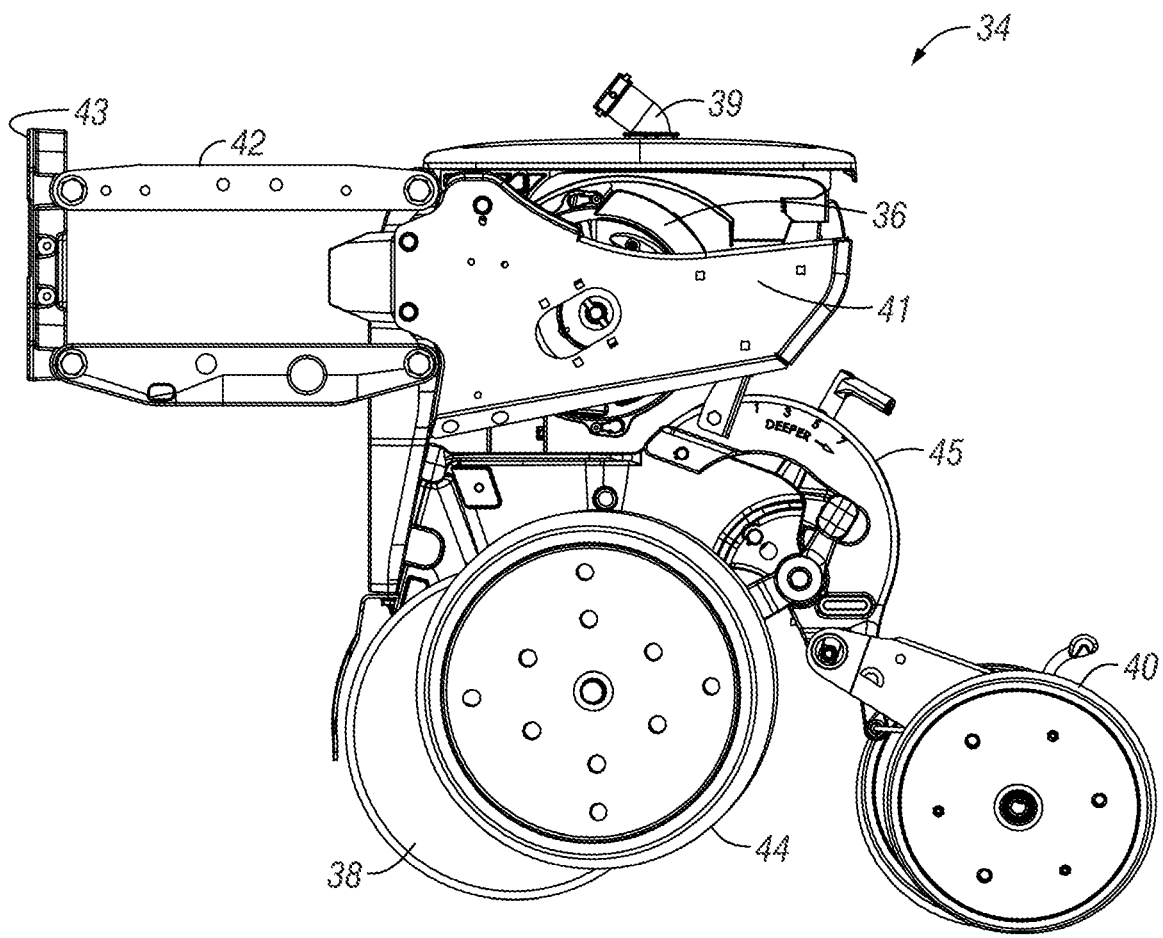
FIG. 2 is a side elevation view of a row unit for use with a planting implement.

FIG. 2 is a side elevation view of a row unit 34, and more specifically, a seeder including a singulating seed meter 36. The row unit 34 includes a seed meter 36, furrow opener 38, row hoppers 39, and furrow closer 40. The row unit 34 also includes standard features such as frame 41, linkage 42, mount 43 for mounting to the planter 10, gauge wheels 44, and depth control mechanism 45. The gauge wheels 44 and depth control mechanism 45 work together to control the depth of the furrow or trench created by the opener 38. Furthermore, the row hopper 39 is connected to a seed supply, such as the central hoppers 24, which can provide the seed meter 36 of each row unit 34 with seed to be planted. Alternatively, the row hopper 39 may be a self-contained unit unconnected to a central hopper.

Figure 10:
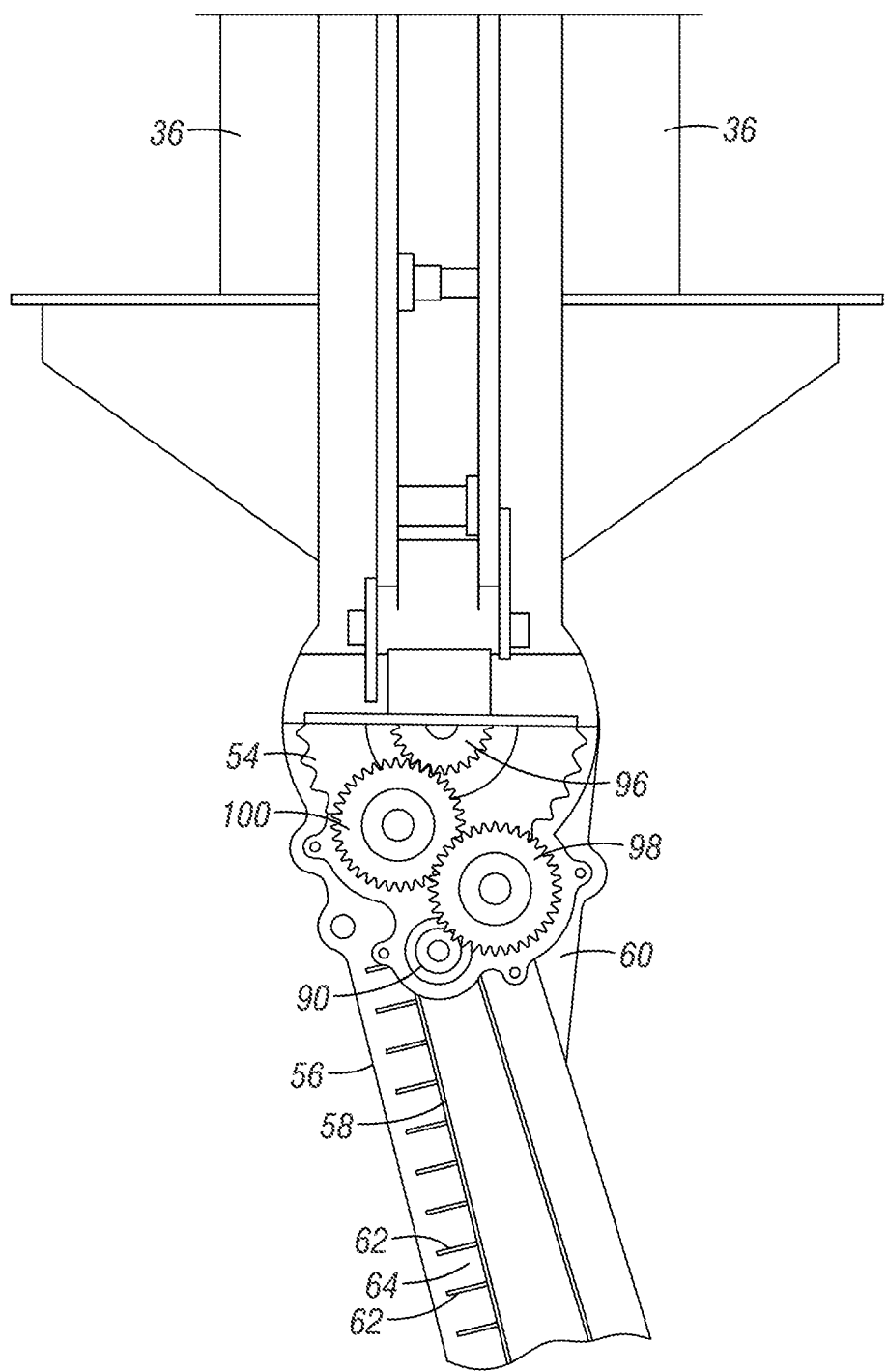
FIG. 10 is a partial detail view of the transmission elements of a rotating brush and flighted conveyor.
Figure 11:
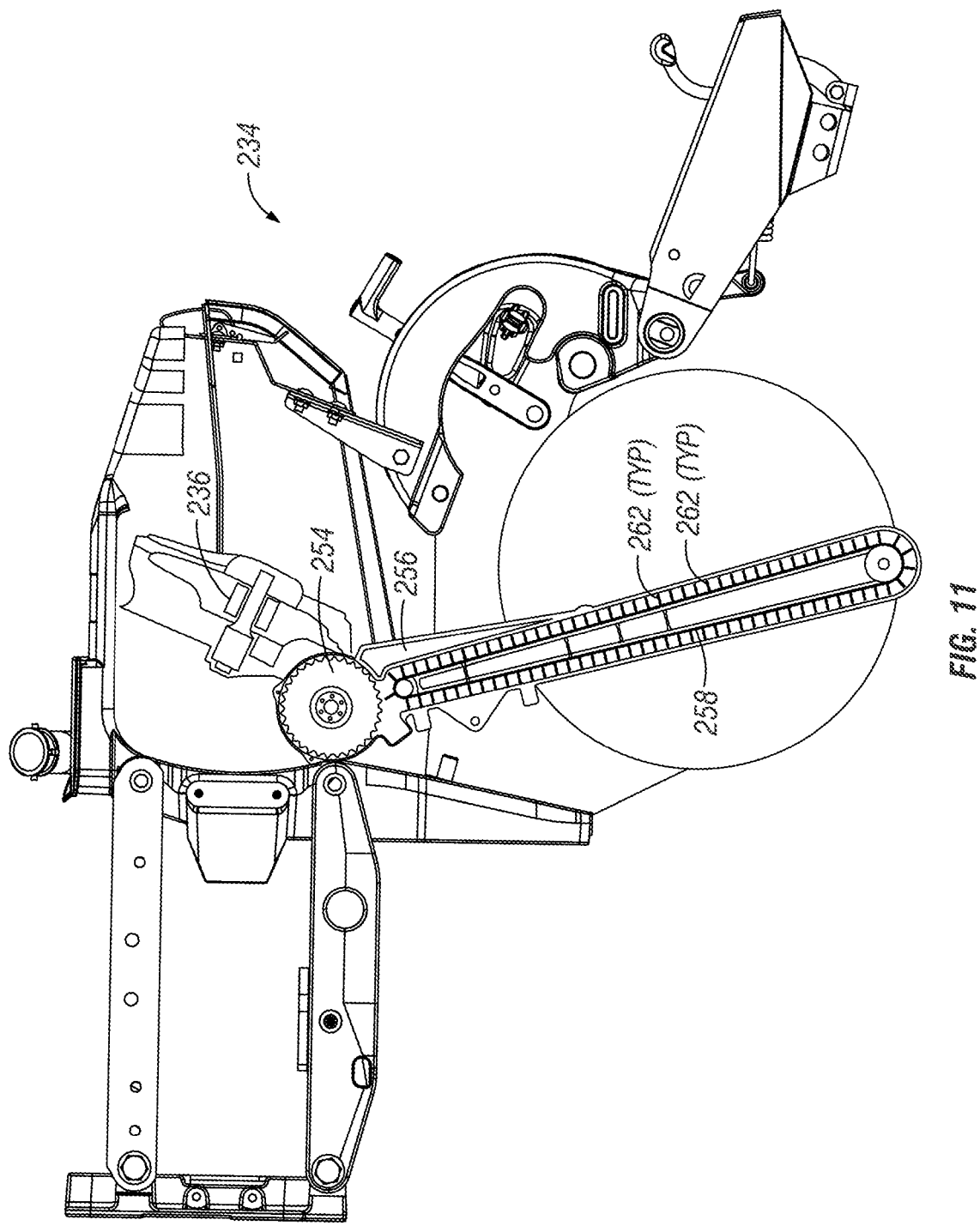
FIG. 11 is a side elevation view of another row unit showing a unitary seed meter and seed delivery system according to the present disclosure.

FIG. 3 is a cut-away side elevation view of another embodiment of a row unit 34 according to exemplary aspects of the disclosure. The embodiment of FIG. 3 is a dual meter seed delivery apparatus 50 that includes two seed meters 36 that can contain different hybrids of the same crop or even seeds for different crops. Typically, only one of the seed meters 36 would be operating at any one time, but there could be overlap and/or operation of both meters contemporaneously, simultaneously, offset from one another, or otherwise in coordination with one another. The meters 36 would turn off and on depending on which hybrid or crop is needed to be planted in each portion of the field. Both meters 36 could be run simultaneously for a high population or to plant two different crops at the same time. In operation, seed would be removed from one (or both) disc of a meter and would be in contact with the rotating brush 54, such as at the left portion of the brush 54 as shown in FIG. 3. The brush 54 would be rotating in a counterclockwise direction when looking at FIG. 3. The brush 54 would then pass the seed to the flighted belt 58, which would take the seed to the ground. As would be understood, the seed would move in an "S" shape from the brush to the belt and then to the ground, as it would be delivered towards the left of FIG. 3 when released from the belt 58. Other exemplary embodiments of the invention utilize a single meter system, for example as shown in FIGS. 10-11.

Figure 4:
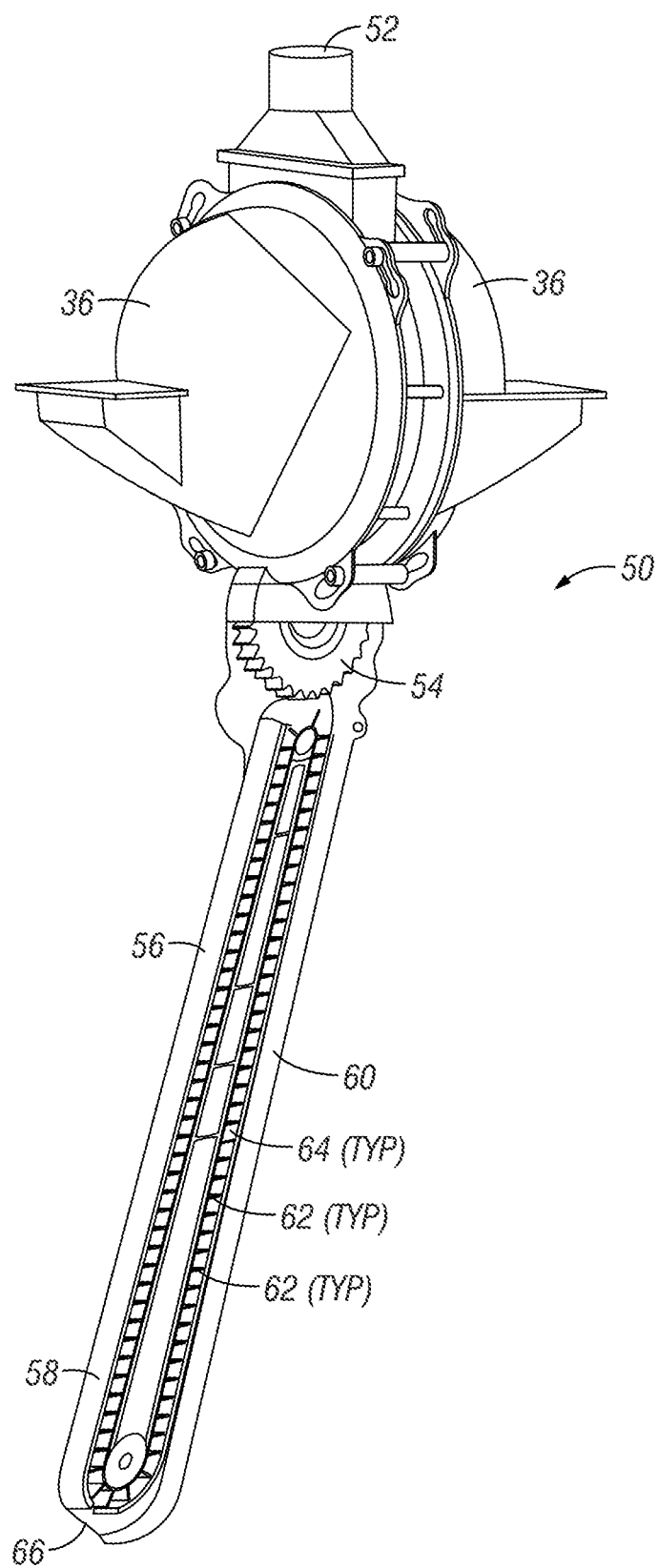
FIG. 4 shows the seed delivery apparatus of FIG. 3 isolated from the other components of the row unit.

FIG. 4 shows the seed delivery apparatus 50 isolated from the row unit 34 shown in FIG. 3. As seen in FIG. 4, the seed delivery apparatus 50 includes a vacuum connector 52 for applying a vacuum to the seed meters 36. It is also noted that the vacuum could be replaced with positive pressure, making the seed meter an air seed meter regardless of the pressure type. Still further, as will be understood with respect to additional figures, any of the embodiments of row units, seed meters, seed delivery systems, and/or any combination of the same can include dedicated or otherwise integrated pressure systems. Such pressure systems are shown and described in co-owned U.S. Pat. No. 9,763,380, issued on Sep. 19, 2017, the contents of which are hereby incorporated by reference in their entirety and for all purposes.

The operation of the seed meters 36 is described in more detail below with reference to FIG. 5. The essential feature of the seed meters 36 is that they present seeds, one at a time, to a rotating brush 54 that is in communication with the seed meters 36. The rotating brush 54 moves the seeds to a conveyor 56. The conveyor 56 delivers the seeds proximate to a furrow where the seeds are ejected from the conveyor 56 with a horizontal velocity component that substantially and reciprocally matches the ground speed of the row unit 34, such that the horizontal velocity of each seed relative to the ground is zero, or nearly zero. In other words, the seeds fall more or less straight down without forward momentum being imparted by the direction of travel of the planter. In the embodiment of FIG. 4, the conveyor 56 includes a flighted belt 58 within a case 60. The belt 58 is made of a resilient material that includes equally spaced flights 62 extending normally from the surface of the belt 58. In operation, the spaces between adjacent flights 62 act as seed receptacles 64 such that a single seed will be located within any one receptacle to be transported from the brush 54 to a release point 66 near the bottom of the furrow, typically at or below ground level. For example, the release point may be about 1.5 inches from the bottom of the furrow.

Figure 5:
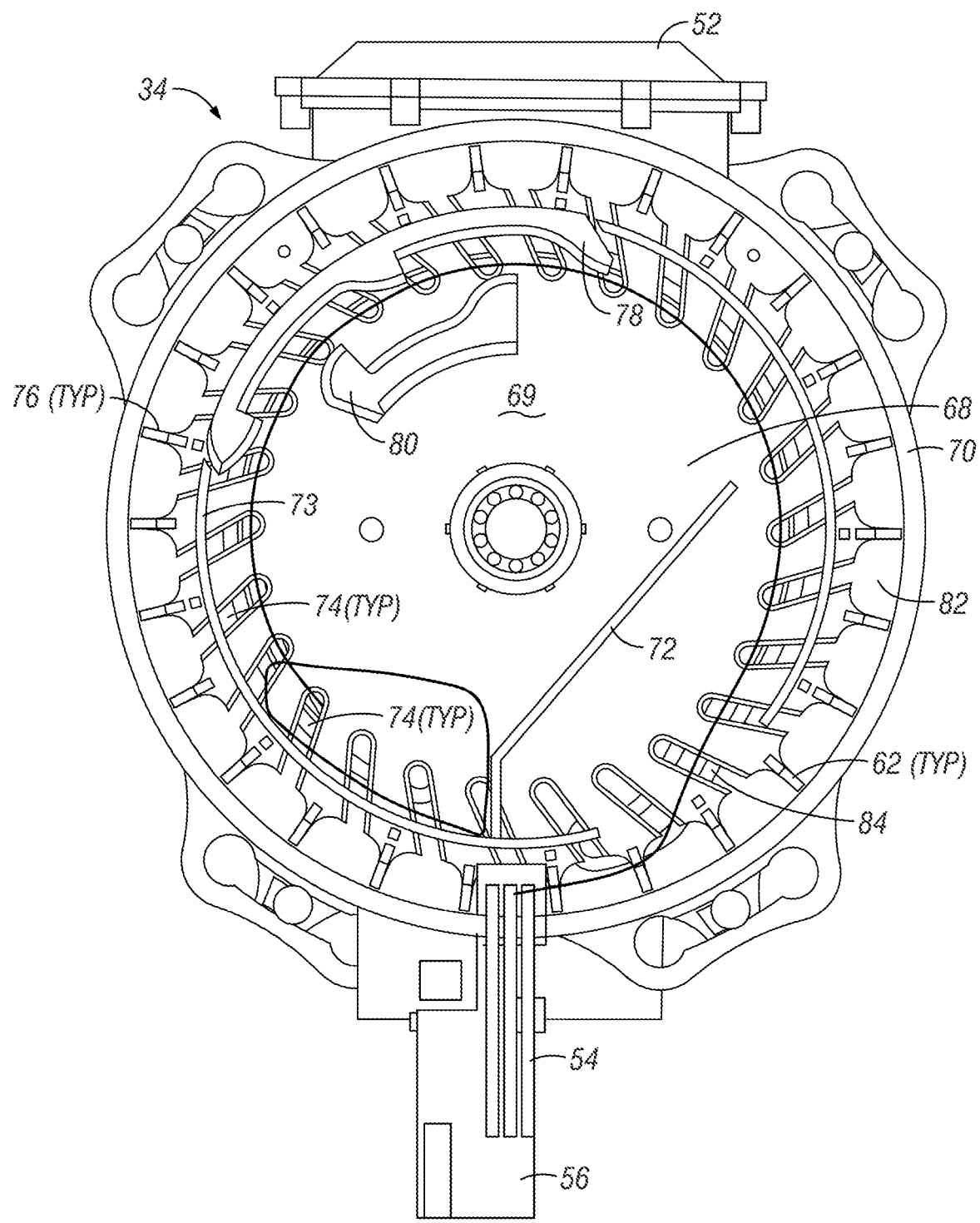
FIG. 5 is an internal view of a seed meter showing components and a seed path for a seed to move through the meter.
Figure 6:
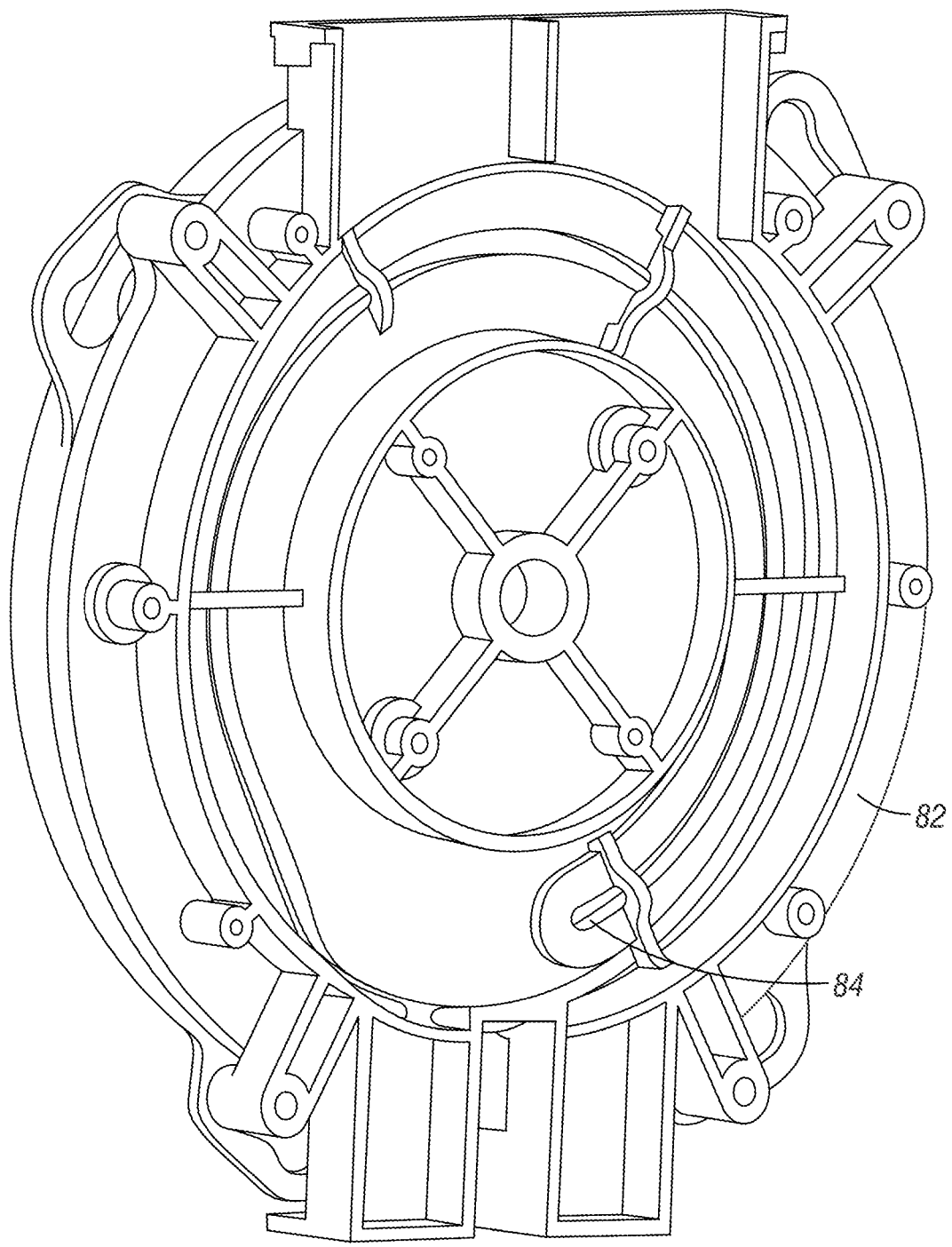
FIG. 6 shows an inner cover of the seed meter of FIG. 5, including a vacuum channel.

FIG. 5 shows a detail cross-section view of a seed meter 36 according to an exemplary embodiment of a dual-meter system. Each seed meter 36 includes a rotating disc 68 within an outer case 70. A front surface 69 of the disc 68 is visible in FIG. 5. Seed retaining slots 74 are arrayed along the outer portion of the disc 68. The slots 74 extend angularly relative to a corresponding radius of the disc 68, such that the inner portion of each slot 74 leads the outer portion of the slot as the disc rotates (in a clockwise direction as seen in FIG. 5). Paddles 76 extend from the perimeter of the disc 68. The paddles 76 are oriented generally transversely perpendicular to the plane of the disc 68. The outer edges of the paddles 76 are close to the inner surface of the outer case 70 such that no seeds can fit between the paddles 76 and the inner surface of the outer case 70. Outer and inner singulator blades 78 & 80 are provided on the inner compartment wall 73 and outer case 70 respectively. An inner cover 82 is provided between the disc 68 and a vacuum chamber that is located between the meters 34. As seen in FIG. 6, the inner cover 82 includes a vacuum channel 84 that forms a vacuum path aligned under the slots 74. The vacuum channel 84 tracks radially outwardly relative to the disc 68 between about 4 o'clock and 6 o'clock as viewed in FIG. 5. In operation this outward tracking of the vacuum channel 84 helps move the singulated seeds retained on the slots 74 outward towards an opening 86 at the bottom of the meter 34.

As shown in FIG. 5, a seed reservoir 88 is formed by internal wall 72 and inner compartment wall 73. As further shown in FIG. 5, a seed pool would be formed generally in the lower left quadrant of the disc 68. As the disc 68 rotates in a clockwise direction individual seeds from the seed pool adhere to the slots 74. The singulator blades 78 & 80 bump off any excess seeds so that by the time a slot 74 rotates past the singulator blades 78 & 80 the slot 74 will contain only one seed in alignment with the vacuum channel 84. As the disc 68 continues to rotate, the vacuum channel 84 causes the seed to move radially outwardly on the slot 74 starting at about the four o'clock position causing the seed to pass through the opening in the inner compartment wall 73. The trailing paddle 76 pushes the seed through a seed loading opening 86 in the outer case 70 where the seed is picked up by the rotating brush 54. The seed loading area is shown in detail in FIG. 7. Fins 88 span between adjacent paddles 76. The fins support the paddles 76, but more importantly match the contour of the seed loading area to permit the brush wheel to pass by without interfering with any seeds that might have been placed in the brush upstream, and also to retain the seeds within the brush cavity.

The rotating brush 54 rotates about an axis that is generally (substantially) normal or perpendicular to the axis about which the disc 68 rotates. In other embodiments, the axes could be transverse at angles other than 90 degrees. In some embodiments it is preferred that the axis about which the brush 54 rotates should be generally perpendicular to the direction of travel of the row unit 34 so that the brush 54 imparts a motion to the seeds that is parallel to the direction of travel of the row unit 34. The rotating brush 54 has resilient bristles that gently retain the seed, and the seed is carried within the brush as it rotates. According to at least one embodiment, the rotating brush 54 includes nylon bristles and is formed by mounting a strip of nylon bristles on a circular hub. The outer diameter of the brush according to one embodiment is about four inches; however other dimensions are feasible depending upon the need. As depicted, the bristles have a wave or saw tooth pattern; however, this not a necessary feature of the brush.

Figure 7:
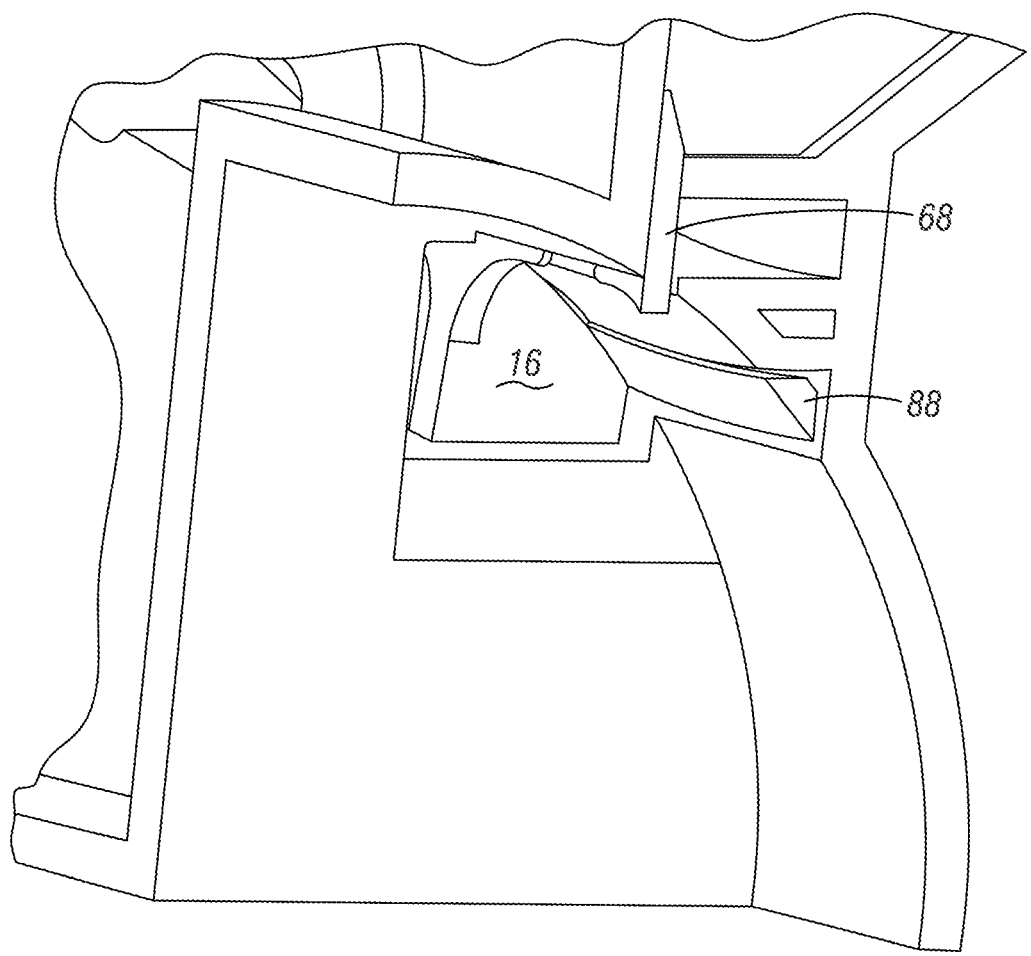
FIG. 7 is a partial detail view of a seed meter opening and a rotating brush chamber.

As shown in FIG. 7, the paddles 76 have a small profile as projected relative to the direction of travel of the brush 54. Furthermore, the speed of the bristles relative to the paddles 76 in the direction of travel of the bristles is much greater than the speed of the paddles 76 relative to the bristles in the direction of travel of the paddles 76. Accordingly, the paddles 76 will pass through the bristles of the rotating brush 54 without significant lateral displacement or deformation of the bristles. According to one embodiment the bristles may be moving about ten times as fast as the paddles 76 at the interface between the paddles 76 and the brush 54.

Figure 8:
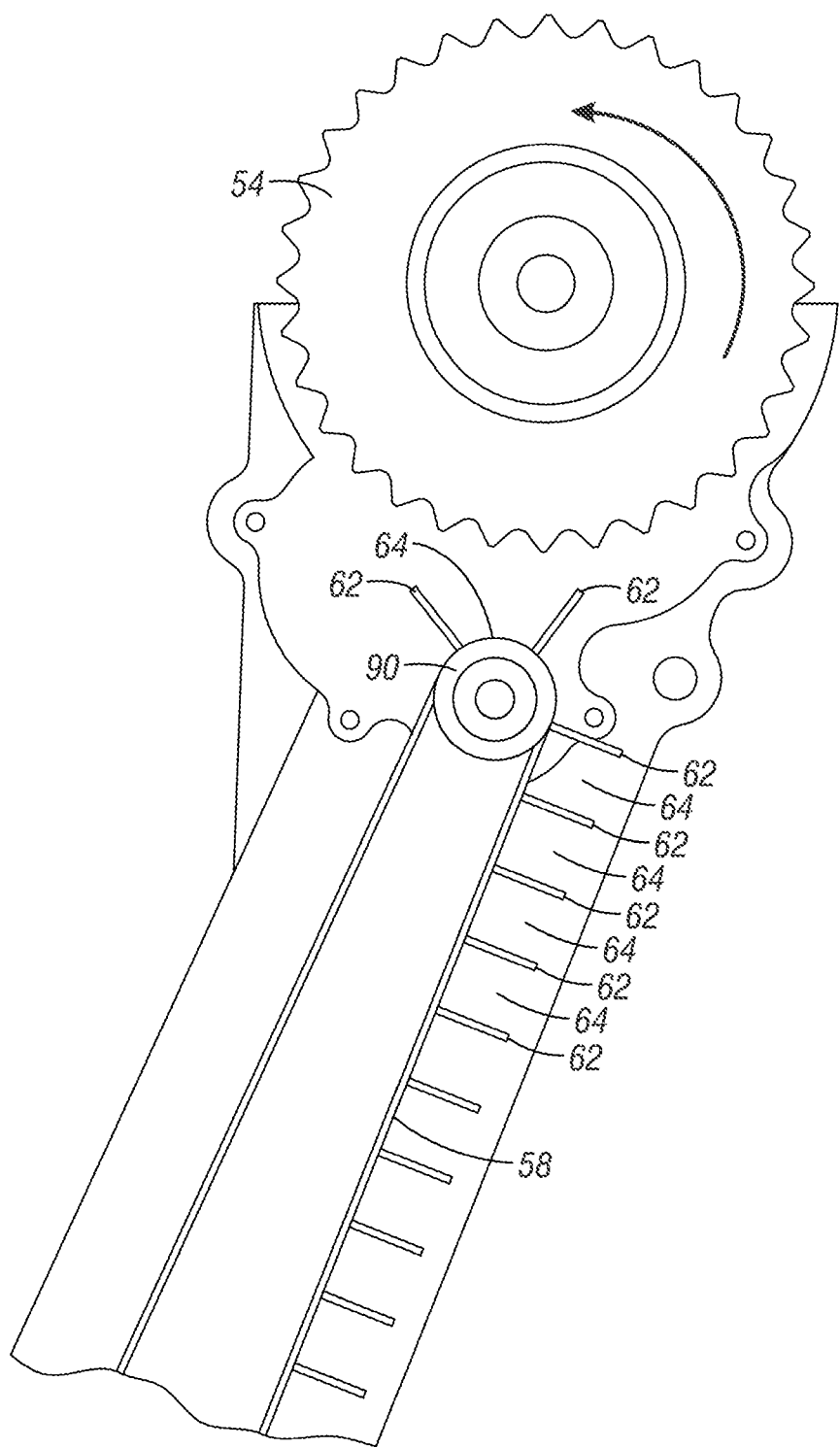
FIG. 8 is a partial detail view of a rotating brush wheel and flighted belt conveyor.

The rotating brush 54 acts as a seed carrier to carry seeds from the seed meters 36 to the conveyor 56. According to an aspect of some embodiments, the rotating brush 54 and the flighted belt 58 are substantially synchronized so that the velocity of a seed as it leaves the brush 54 closely matches the velocity of the flighted belt 58 so that the seed transitions smoothly to a seed receptacle 64 between adjacent flights 62 with minimal jarring. As shown in FIG. 8, the transition of the seed from the brush to the conveyor belt 58 occurs at or near the top of the conveyor 56, where the belt 58 wraps around a tensioning roller (drive pulley) 90. The wrapping of the belt 58 angles the flights 62 away from each other creating a larger opening to the seed receptacle 64 between the flights 62 giving a larger window to transition the seeds accurately one per receptacle 64.

Figure 9:
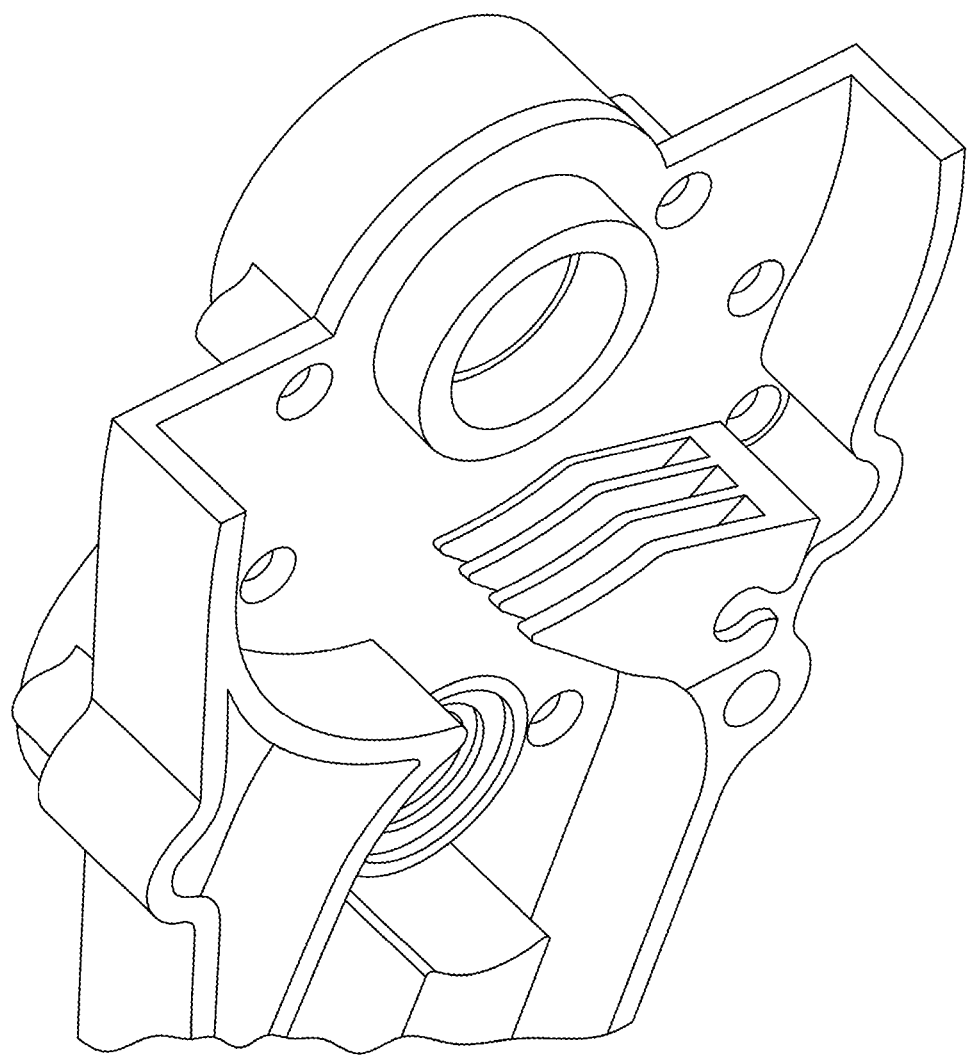
FIG. 9 is a detail view of a comb used to guide seeds from a rotating brush to a conveyor.

As shown in FIG. 9, a comb 92, or similar structure, may be mounted to the conveyor case 60 at the transition area between the brush 54 and the conveyor 56 to facilitate removal of the seeds from the brush 54. Specifically, the comb 92 may include individual tines 94 that extend into the brush 54. The tines are shaped to deflect and guide the seed downwardly out of the brush 54 onto the moving flighted belt 58.

As shown in FIG. 10, the synchronization of the brush 54 with the flighted belt 58 may be accomplished by interconnecting the drive mechanisms for the brush 54 and the flighted belt 58. For example, the brush 54 may have gear 96 that is driven by gear 100, and tensioning roller 90 may be driven by gear 98. Because gears 98 and 100 are meshed, they cause the rotation of the tensioning roller 90 and the brush 54 to be synchronized. One of gears 98 or 100 is driven and provides impulse that corresponding drives the other of the gears 98 or 100. The speed of the gears 98 and 100 is controlled mechanically, or electronically, based upon the ground speed of the planter and the desired spacing of the seeds. Accordingly, as the ground speed increases, the speed at which the brush 54 rotates and the belt 58 moves increases to eject seeds at a higher speed to maintain a uniform spacing and assure that the seeds are falling straight down with little or no forward or rearward momentum relative to the ground. Each of the components, the seed disc 68, rotating brush 54 and the conveyor 56 may be driven by individual electric motors that are coordinated by a central control or processing unit (not shown) that receives input regarding the ground speed of the unit and desired spacing of the seeds. Alternatively, components may share driving force from one or more inputs such as electric motors, internal combustion motors, or motion driven linkages.

Similarly, the speed of the rotation of the disc 68 in the seed meters 36 is also proportional to the ground speed of the planter 10 (and desired planting population) so that seeds are being provided to the brush 54 at the proper rate. The disc 68 may be mechanically connected to wheels on the ground to assure that the speed of the disc 68 is proportional to the ground, or electronic sensors may be used to set the speed of the disc 68. Still further, GPS, tractor speed calculations, or the like, may indicate and/or otherwise provide the ground speed for the rotational speeds to use to attempt to substantially match such that the seed is released with zero relative velocity. The ground speed could be the tractor, the planter, portions of the planter (e.g., at the row units), or some combination thereof. The disc 68 may be driven by electronic step motors or other known devices for driving rotation.

Figure 12:
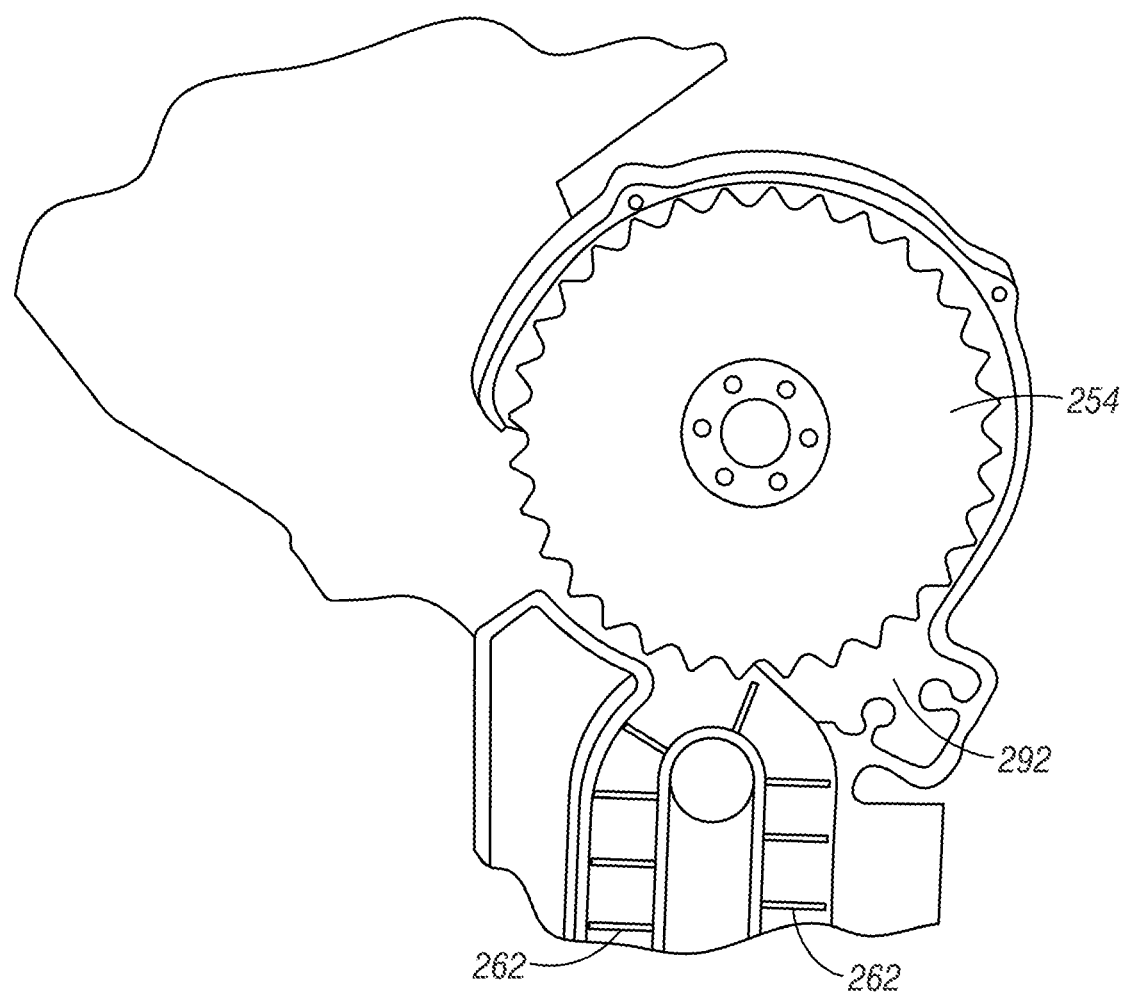
FIG. 12 is a partial detail view of the seed meter, wheel brush, and flighted conveyor of the row unit of FIG. 11.
Figure 13:
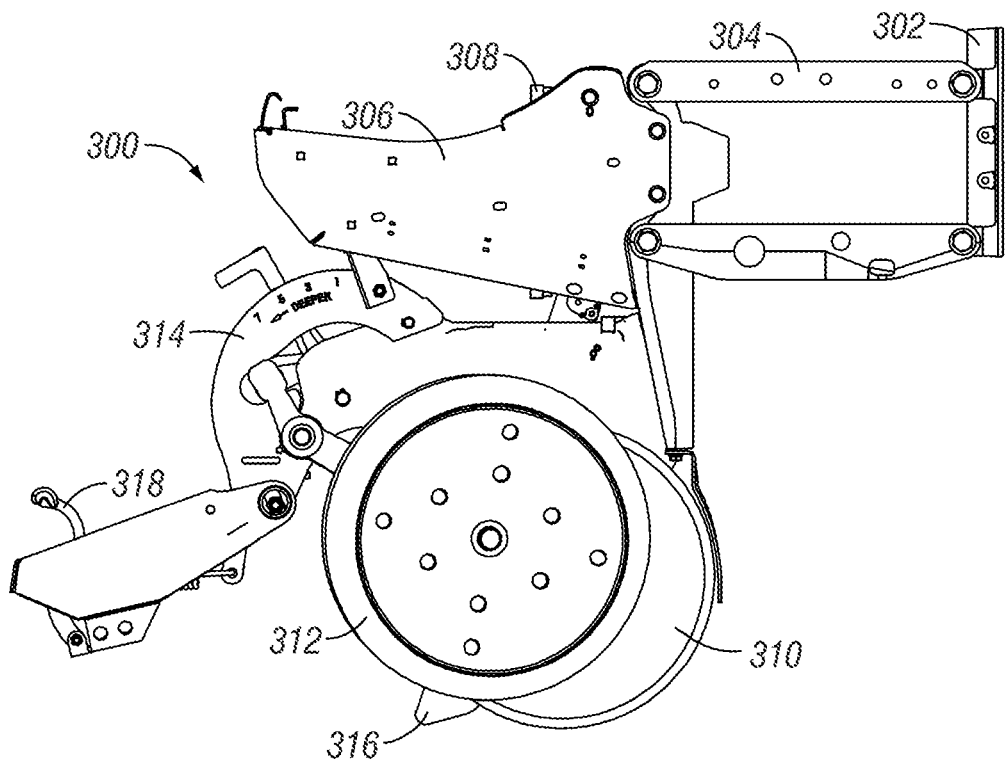
FIG. 13 is a side elevation view of a row unit with a seed meter and seed delivery system according to another embodiment of the present disclosure.
Figure 14:
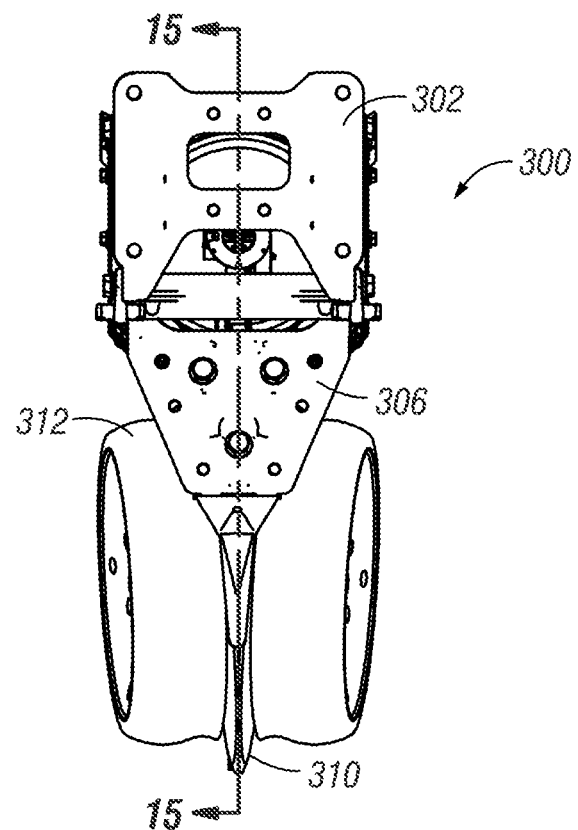
FIG. 14 is a front elevation view of the row unit with seed meter of FIG. 13.

FIGS. 11 and 12 show a row unit 234 that is similar to unit 34 described above, but utilizes a single seed meter 236. A seed delivery apparatus 250 includes a seed meter 236 that presents seeds, one at a time, to a rotating brush 254 that is in communication with the seed meter 236. The rotating brush 254 moves the seeds to a conveyor 256. The conveyor 256 delivers the seeds proximate to the bottom of a furrow where the seeds are ejected from the conveyor 256 with a horizontal velocity component that reciprocally matches the ground speed of the row unit 234, such that the horizontal velocity of each seed relative to the ground is zero, or nearly zero. Similar to the dual-meter embodiment of FIG. 4, the conveyor 256 includes a flighted belt 258 within a case 260. The belt 258 is made of a resilient material that includes equally spaced flights 262 extending normally from the surface of the belt 258.

In the single meter embodiment of FIGS. 11 and 12, the seed meter 236 includes a rotating disc 268 that rotates about an axis that is aligned with a direction of travel for the row unit 234, but inclined relative to horizontal. The seeds are provided to the rotating brush wheel 254 at a lower portion of the seed meter 236. However, unlike the dual-meter design described above, rather than using paddles 76 to move the seed into the brush 254, the single seed meter 236 relies upon the path of the vacuum channel, as well as gravity and the momentum of the seed to move the seed into brush 254. Once the seed is received in the bristles of the brush 254, the brush 254 carries it a short distance to the conveyor 256 where the seeds are transferred to the conveyor belt 258. A comb 292 helps guide the seeds on to the belt 258 between the raised flights 262. The seed is preferably moving with the same velocity as the flights 262 when it is released from the brush 254 to assure a smooth transition to the belt 258. The seed then travels down the length of the conveyor with one seed between each adjacent flight 262 under the force of gravity. This does not necessarily mean a seed will be between every two flights, but instead, a seed will be temporarily housed between two flights, the inner portion, and an end wall of the belt housing. The equal spacing of the flights 262 assures that the seeds will be equally spaced as they are ejected reward from the bottom of the conveyor 256 at a velocity that offsets the forward speed of the planter.

FIGS. 13-22 illustrate another embodiment of this disclosure. A row unit 300 is shown in FIGS. 13-16. The row unit 300 includes many similar features as described herein. A mounting bracket 302 permits attachment to an implement bar. A linkage 304 connects the mounting bracket 302 with a frame 306 that supports the working elements of the row unit 300. The frame 306 is connected to a furrow opener 310 in the form of disc blades or the like. A furrow closing device (not shown) is mounted to a furrow closing adjustment mechanism 318 at the trailing end of the unit 300. Gauge wheels 312 are provided in close proximity to the furrow opener 310 to control the depth of the furrow opener 310. An adjustment mechanism 314 is provided to adjust the relative position of the gauge wheels 312 to the furrow opener 310. Also mounted to the frame 306 is a seed delivery apparatus that includes seed meter 308 and a seed conveyor 316.

Figure 15:
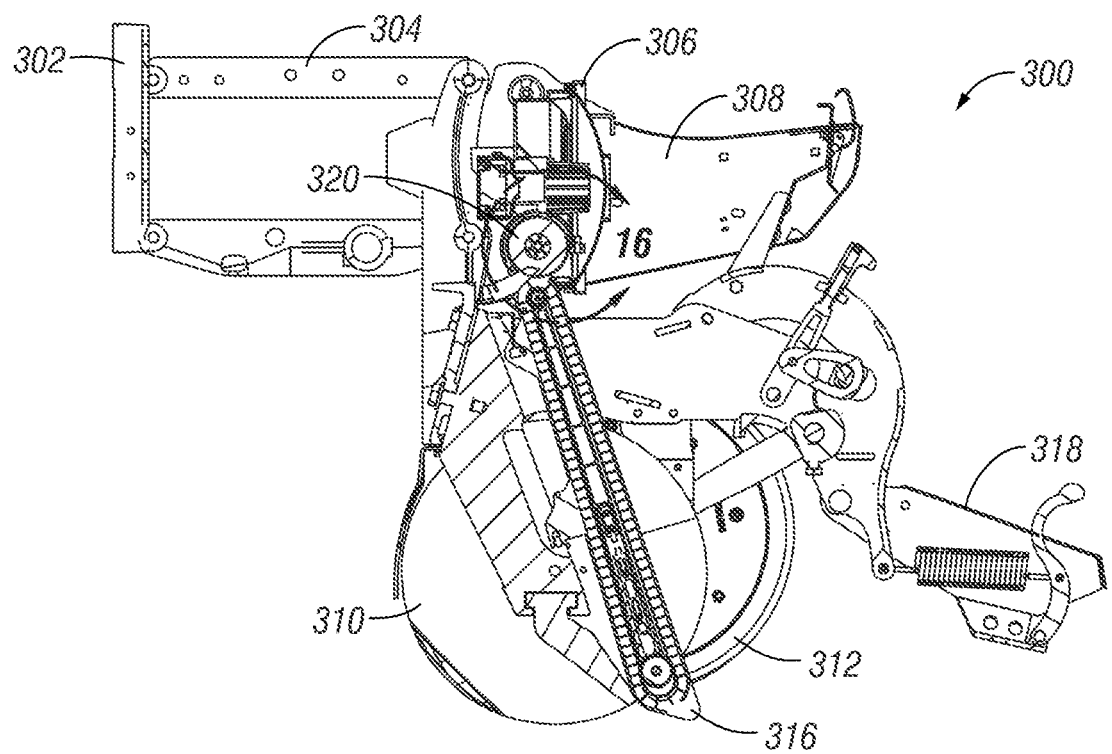
FIG. 15 is a cross-section side elevation view of the row unit with seed meter of FIG. 14.
Figure 16:
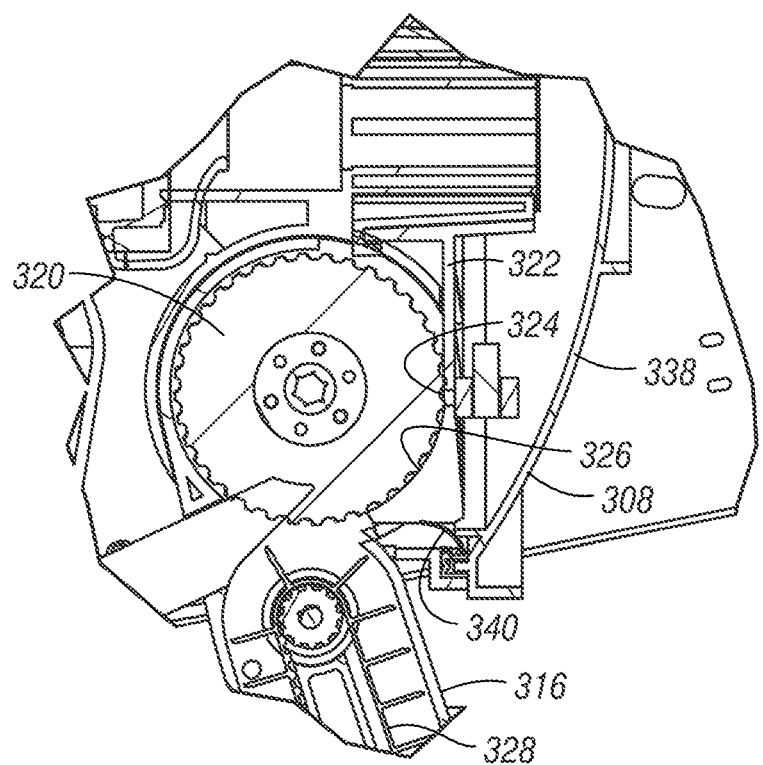
FIG. 16 is a detail close-up of a portion of the cross-section side elevation view of FIG. 15.

Further details of the seed delivery apparatus of the row unit 300 can be seen in the cross-section views of FIGS. 15 and 16. The seed meter 308 includes a rotating seed disc 322. The seed disc 322 includes several apertures 324 that each retain a single seed (not shown) as the seed disc 322 rotates, in a similar manner to the embodiments described above. However, in the seed delivery apparatus of unit 300, a rotating wheel, such as rotating brush 320 is provided in close engagement with a front face (seed side) of the disc 322 to disengage and/or otherwise remove the seed from the aperture 324 and move the seed towards the conveyor 316. More particularly, the brush 320 moves the seed radially outwardly (relative to the seed disc) along a curved portion 326 of a front face (seed side, which is opposite the vacuum side of the disc) of the rotating seed disc 322. As described in the embodiments above, the brush wheel 320 accelerates the seed to closely match the speed and direction of a conveyor belt 328 within the conveyor 316 that takes the seed to a release position very near the bottom of the furrow. In contrast to the embodiments described above, in this embodiment, the wheel brush 320 engages the seed directly from the face of the seed disc and moves it towards the conveyor 316, as compared to the embodiments described above wherein the wheel brush is located tangentially to the seed disc and receives the seed after has disengaged from seed aperture.

Figure 17:
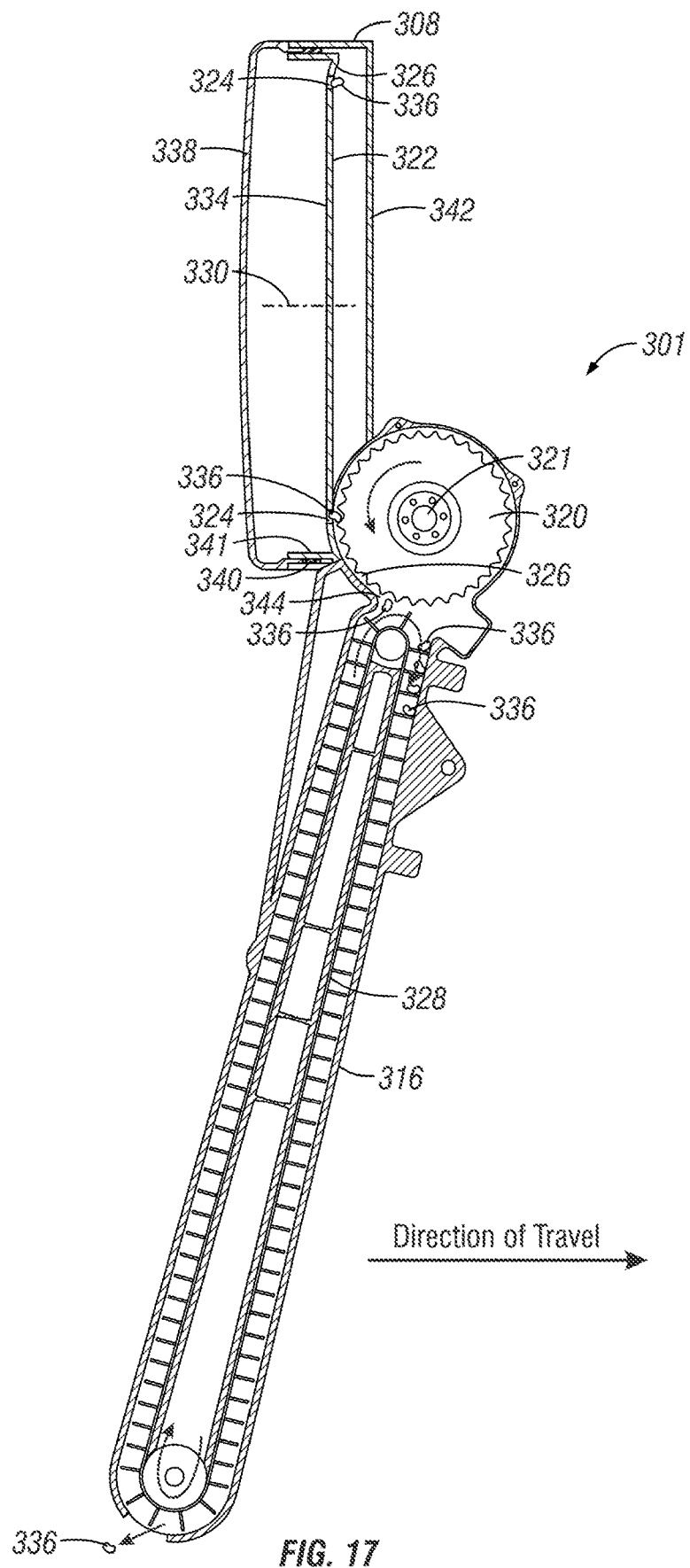
FIG. 17 is a cross-section schematic illustrating features of the seed meter and seed delivery system of FIGS. 13-16.

FIG. 17 shows a schematic that illustrates some of the features of a seed delivery system 301 that incorporates the concepts of the system used in row unit 300. The seed disc 322 in the seed meter 308 rotates about a seed disc axis 330. The seed meter 308 includes structure for causing the rotation of the seed disc 322 that is not shown, but is well-known (e.g., electric motor operatively connected to the disc). The seed disc 322 has a front face 332 (aka the seed side) and a rear face 334 (aka as the vacuum or pressure side). The front face 332 of the seed disc 322 is generally flat surrounding the seed disc axis 330, though this geometry is not generally critical. An outer portion 326 of the seed disc 322 is curved to correspond with the radius of the rotatable wheel 320 that rotates about a wheel axis 321. The curvatures need not match in all embodiments. The apertures 324 are provided through the seed disc 322 at or near where the curved portion 326 begins. Individual seeds 336 are retained on front face 332 of the seed disc 322 at the apertures 324. The seeds 336 are retained in place by a pressure differential across the apertures 324, which could be a positive or negative (vacuum) pressure. According to the embodiment shown, a partial vacuum is created between the rear face 334 of the seed disc 322 and a rear cover 338. A singulating mechanism (see FIG. 22) may be used to assure that only a single seed 336 is associated with each aperture 324. A gasket 340 surrounds an outer wall 341 of the rotating seed disc 322 and provides a generally air tight seal between the seed disc 322 and the rear cover 338. While the gasket 340 is positioned at the outer wall in the figure, it is noted that it could also be placed at the inner side of the seed disc outer wall, such as shown in other embodiments. Therefore, it should be appreciated that the gaskets could be placed outside of or inside of the outer wall/edge of the seed disc such that it will create a substantially full pressurized zone of the disc. A front cover 342 encloses the seed meter 308 and snap fits with the rear cover to hold the gasket 340 in place. The seed disc 322 can rotate against a leg of the gasket 340. Because the gasket 340 extends up a portion of the outer wall 341, the seal between the seed disc 322 and the rear cover is not broken by small relative movement of the rear cover and the seed disc 322 relative to each other.

In operation, the seed disc 322 rotates continuously. As the apertures pass through a seed pool (not shown), seeds 336 will adhere to the apertures 324 and be singulated by passing through a singulator structure 348 (see FIG. 20). Eventually each seed 336 on an aperture 324 reaches the rotating brush wheel 320. The rotating brush wheel 320 engages the seed 336 and moves it radially outwardly off of the aperture 324 along the curved surface 326 of the seed disc 322. The wheel 320 accelerates the seed to match the speed and direction of the outer portion of the wheel 320 and provides the seed 336 at an opening 344 in the seed meter that is adjacent to the conveyor at a velocity that closely matches the speed and direction of the conveyor belt 328. Because the wheel 320 is moving much faster than the seed disc 322 (on the order of ten times faster at the apertures 324) there is little circumferential movement of the seed 336 relative to the brush 320 due to momentum and friction with the rotating seed disc 322 over the short distance between the aperture 324 and the conveyor 316. In that regard it can be beneficial for the front face 332 of the seed disc 322 to be a low friction surface to both reduce friction forces applied to the seed 336 as it is moved by the brush 320 which could cause unwanted lateral movement of the seed and in extreme cases potentially damage to the seed itself.

Figure 18:
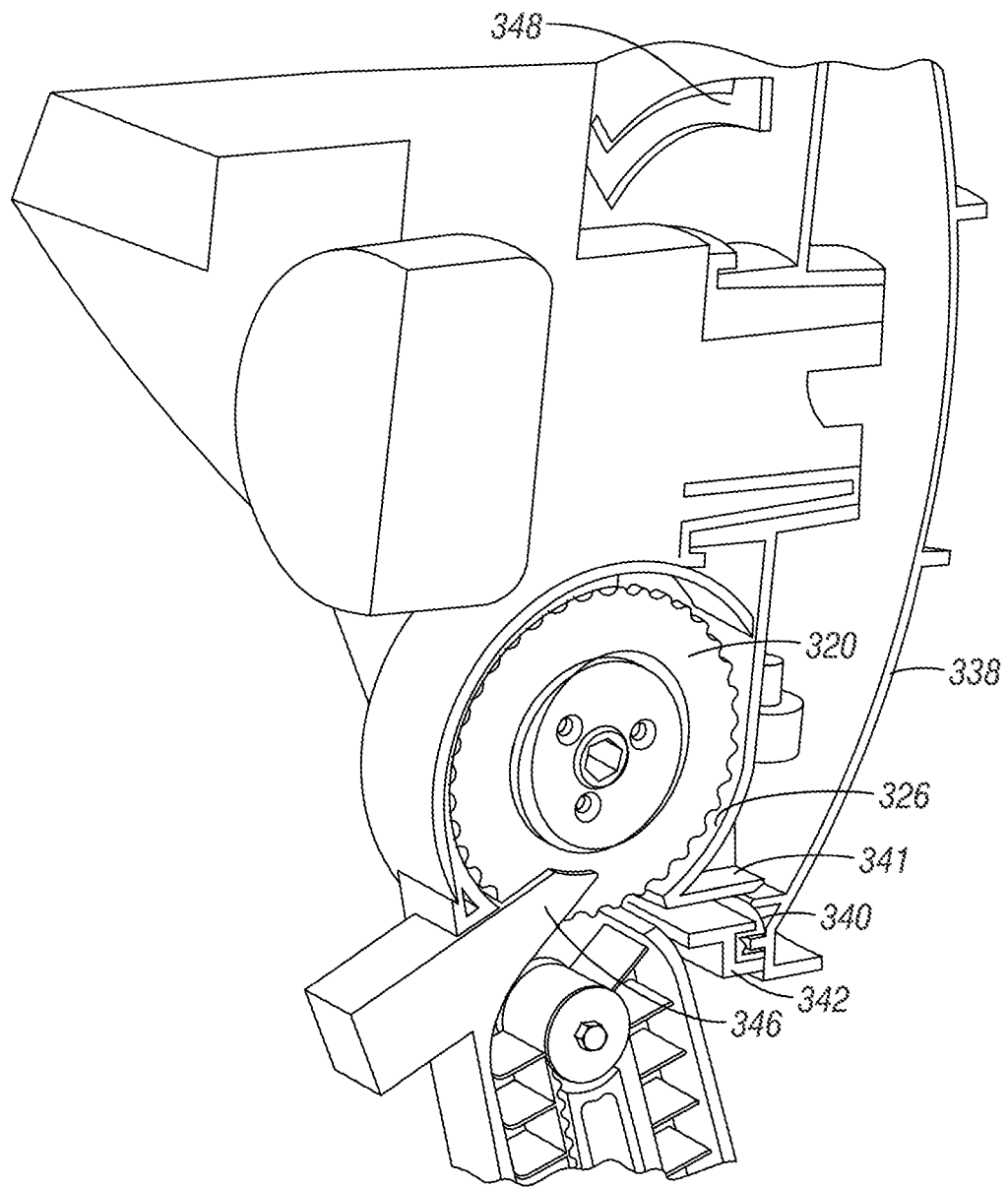
FIG. 18 is a partial cross-section isometric view of the seed meter and seed delivery system of FIGS. 13-16.
Figure 19:
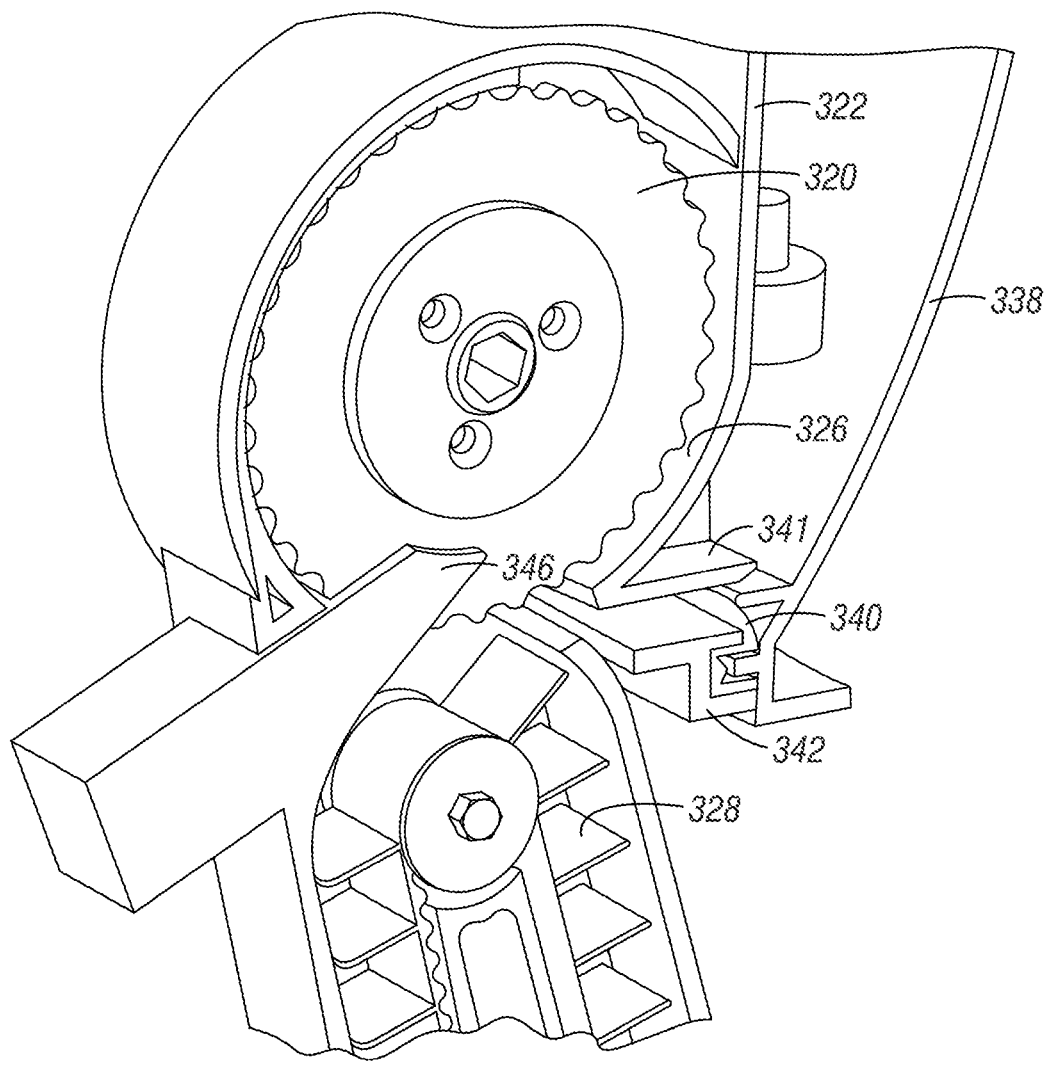
FIG. 19 is a detail close-up of the partial cross-section isometric view of the seed meter and seed delivery system of FIG. 18.
Figure 20:
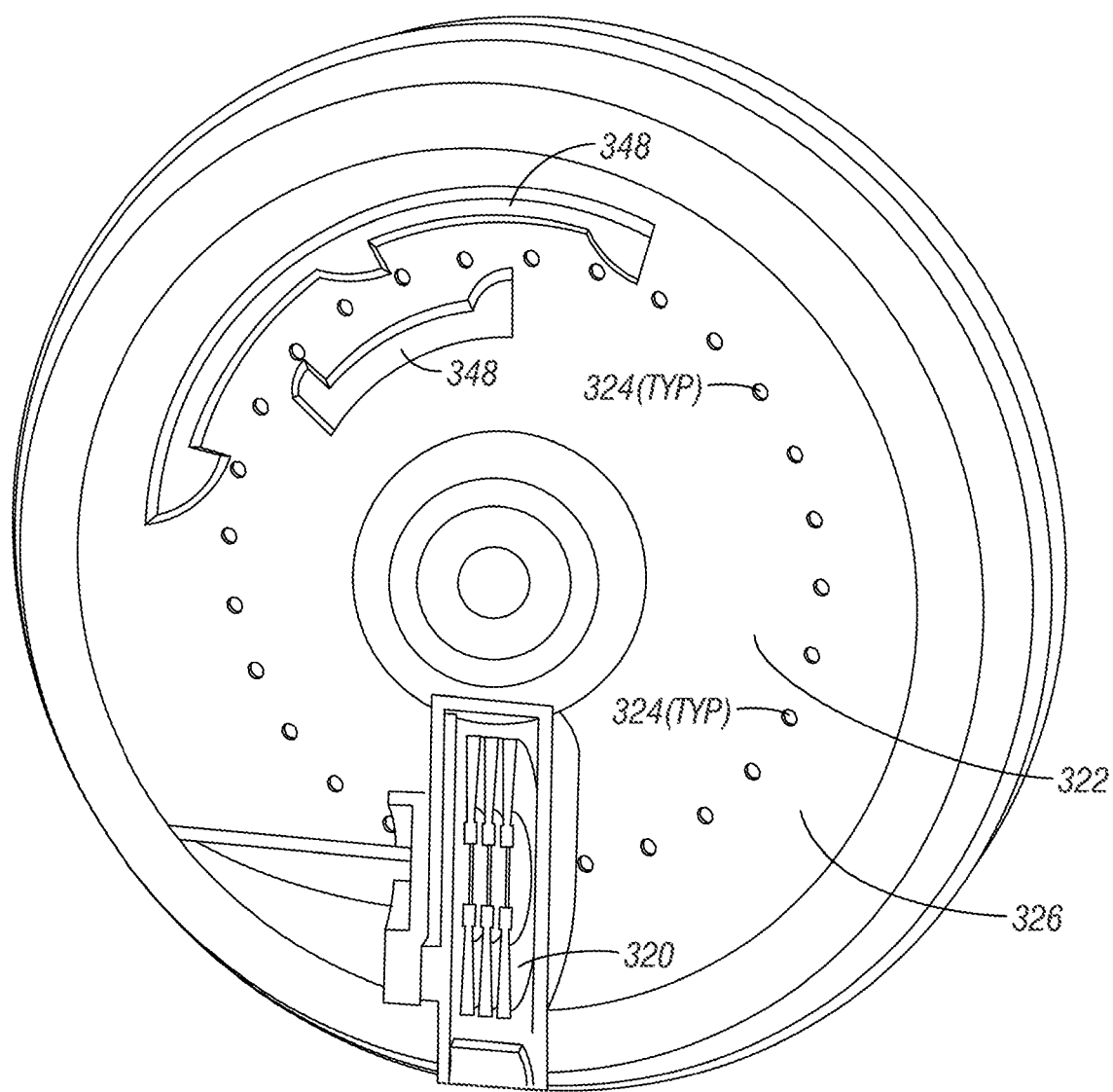
FIG. 20 is a detail partial cross-section view of a portion of the seed meter of FIG. 19.
Figure 21:
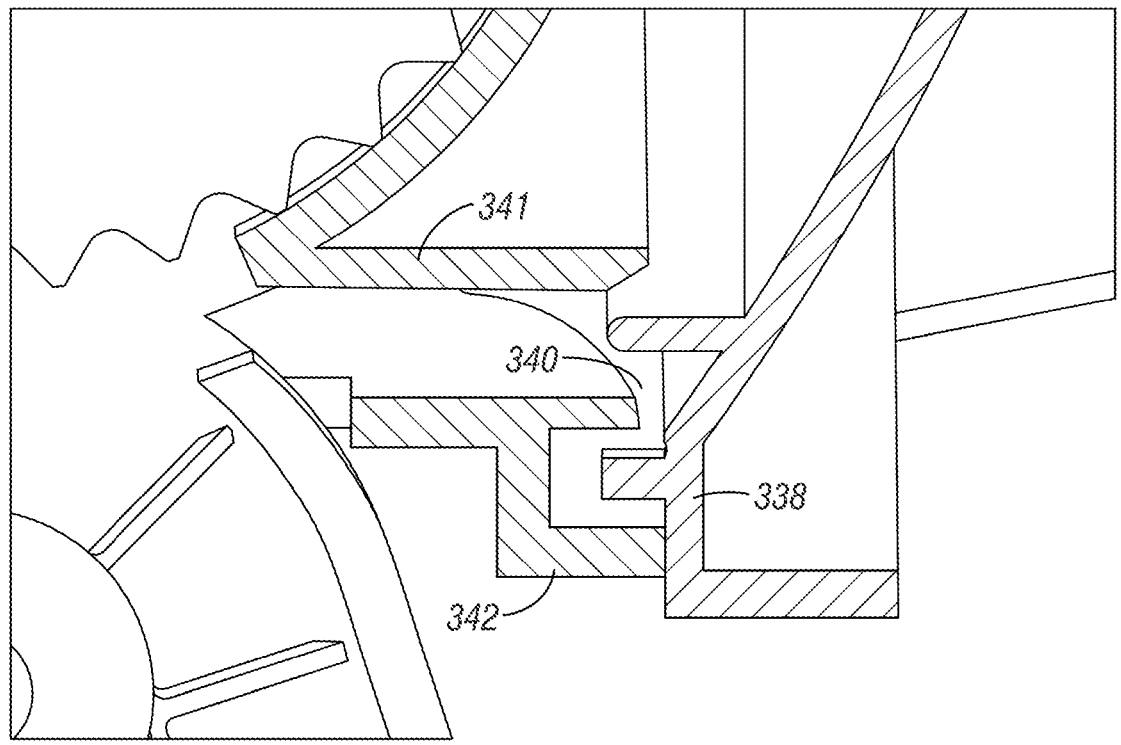
FIG. 21 is a partial detail cross section showing the connection and seal between the seed meter wheel and cover at a lower portion of the seed meter.
Figure 22:
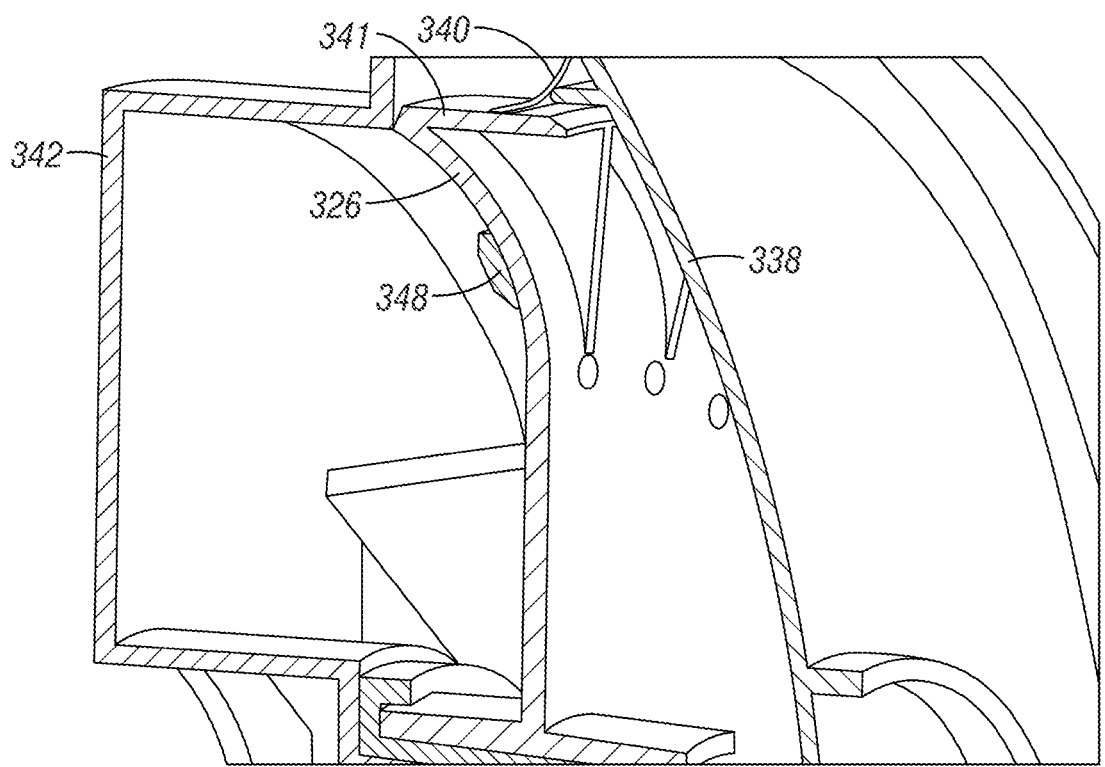
FIG. 22 is a partial detail cross-section isometric view showing the connection and seal between the seed meter wheel and cover at an upper portion of the seed meter.
Figure 23:
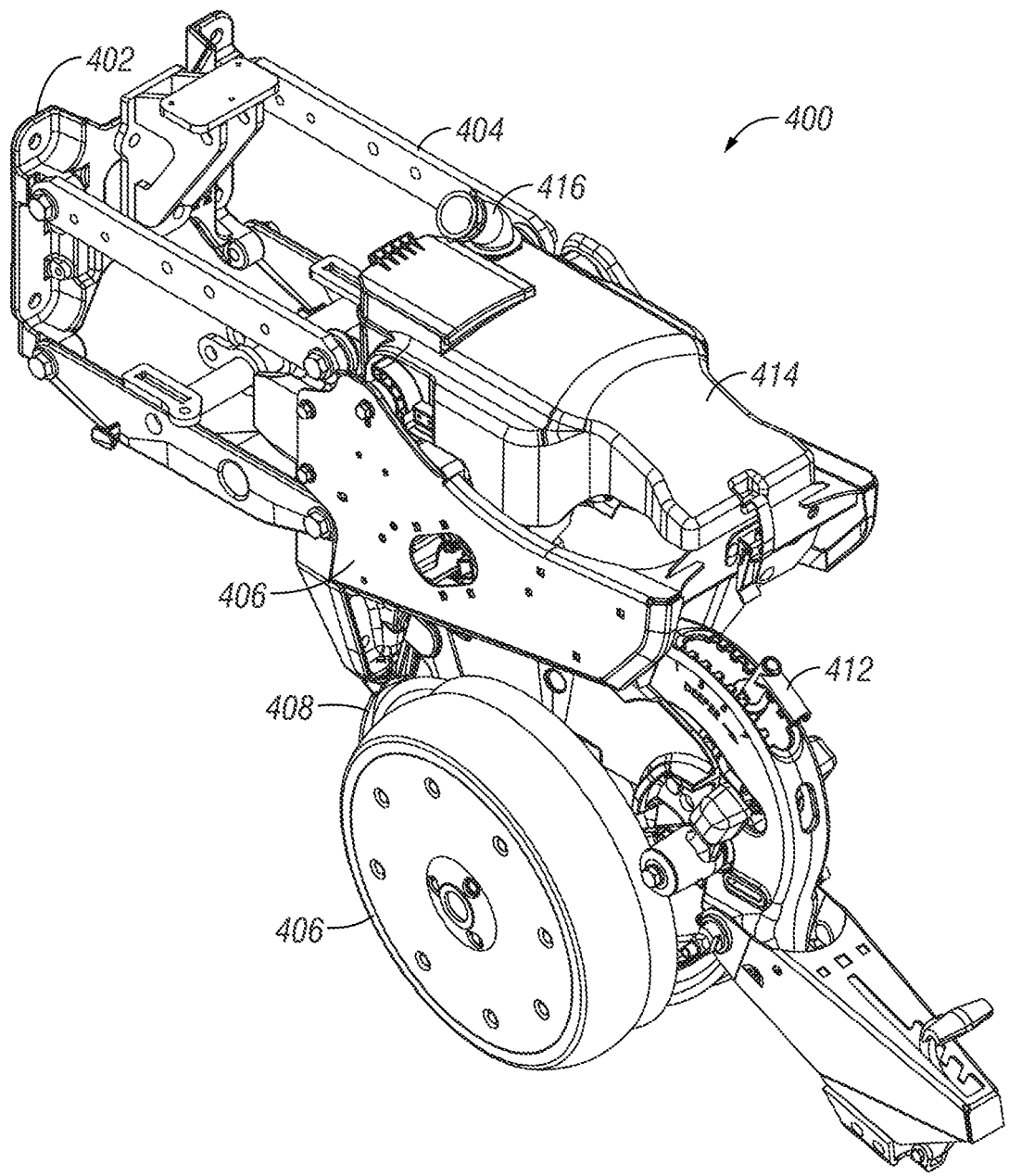
FIG. 23 is a perspective view of a row unit according to additional aspects of the invention.
Figure 24:
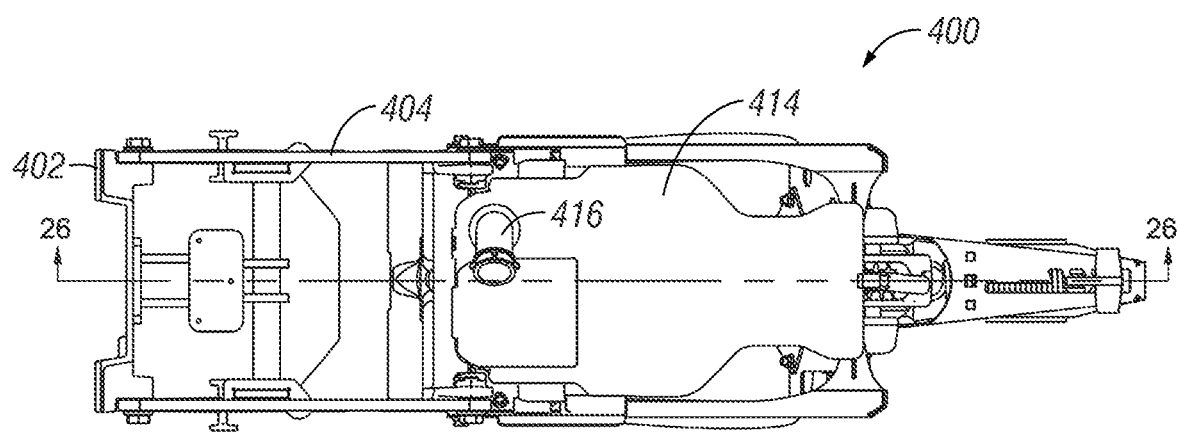
FIG. 24 is a top plan view of the row unit of FIG. 23.
Figure 25:
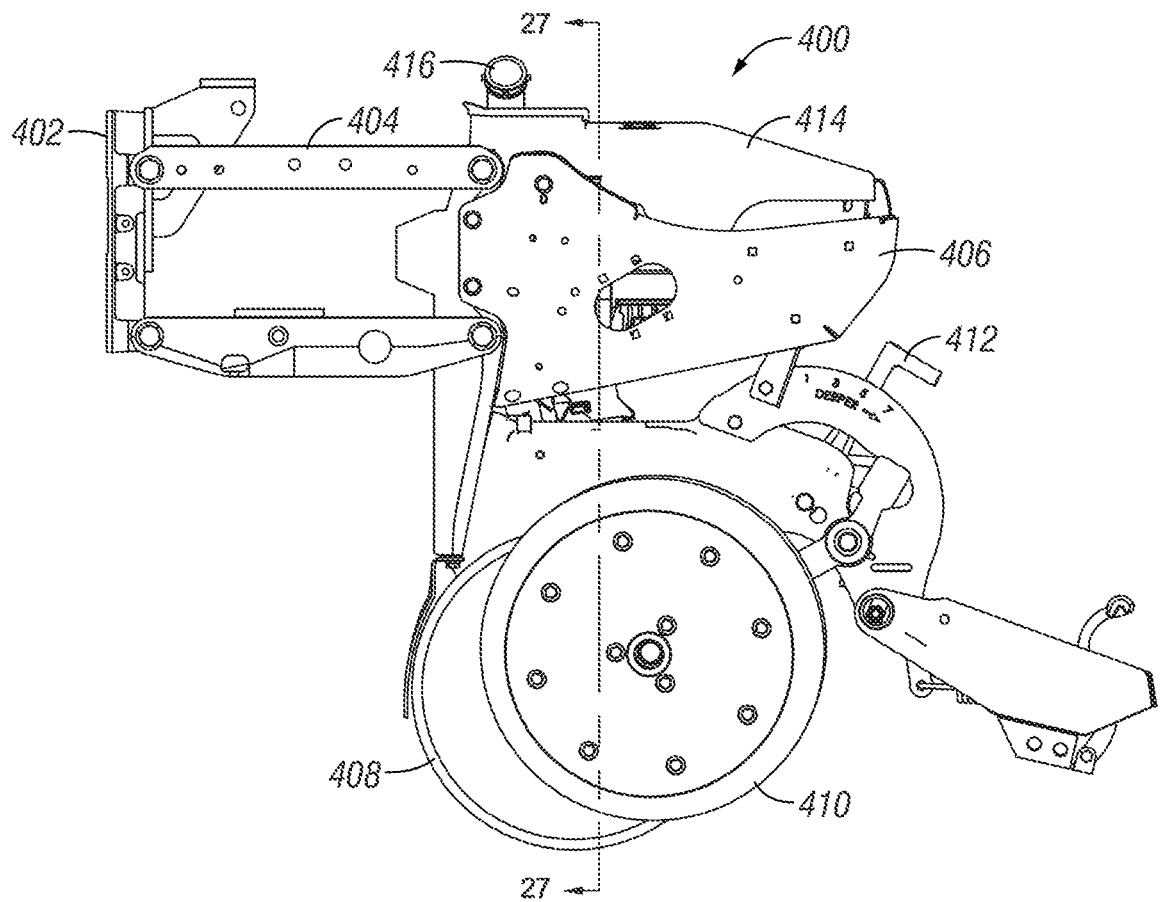
FIG. 25 is a side elevation view of the row unit of FIG. 23.

FIGS. 18-22 show various views of various features of the seed delivery system 301. In FIGS. 18 and 19 a comb structure 346 is shown that assures that the seeds do not stick in the brush 320 and are transferred to the conveyor belt 328. As best shown in FIGS. 19 and 21, the gasket 340 includes a flexible leg that extends along the outer wall 341 of the seed disc 322. Again, it is noted that the gasket 340 could also be placed at the inner wall or inner side of the wall as well. The front cover 342 and the rear cover 338 include projections that capture the gasket 340 to hold it in place and to effectively stiffen the leg of the gasket 340 by limiting its free flexing portion. The singulator structure 348 is best seen in FIG. 20. The structure is fixed to an inner surface of the front cover. As seeds on the circular array of apertures 324 pass through the singulator structure 348 excess seeds are knocked off, leaving a single seed on each aperture. The singulator can take many forms, such as a single or multi-blade singulator (see, e.g., U.S. Pat. No. 9,277,688, hereby incorporated by reference in its entirety), knock-offs, wheels, or brushes, such as that shown in FIG. 39 of the present disclosure. The type of singulator should not be limiting to the invention.

FIGS. 23-27 disclose additional views of a row unit 400 according to and including aspects of the invention. Similar to that previous disclosures of row units, the row unit 400 includes a plate 402 or other member for attaching the row unit 400 to a toolbar of a planting implement. Extending generally from the faceplate 402 is a linkage 404, which allows for some vertical movement of the row unit 400 relative to other row units and components of the planting implement. While not shown, a system, apparatus, and/or assembly for providing down and/or up force for the row unit may also be included for use with the row unit. Such a system is shown and described in U.S. patent application Ser. No. 16/047,236, which is hereby incorporated by reference in its entirety. A frame 406 is also included. The row unit 400 includes opening elements 408, which are in the form of opening or coulter wheels in the figures. Gage wheels 410, a depth adjustment system 412, and a sensor 418 are included to adjust the depth of the furrow created and to sense and adjust an amount of supplemental down and/or up force for the row unit.

Connected to the frame 406 is a hopper attachment 414, which may also be referred to as a mini hopper. The attached 414 includes, in part, a lid portion, a receptacle portion, and a conduit attachment 416. The conduit attachment 416 can be attached, via delivery system, to one or more bulk hoppers of the planting implement to receive on-demand amounts of seed for the row unit. The seed can be stored, at least temporarily, at or in the attachment 414, where it can then be fed into a seed meter seed pool for singulation and delivery to the ground.

Figure 26:
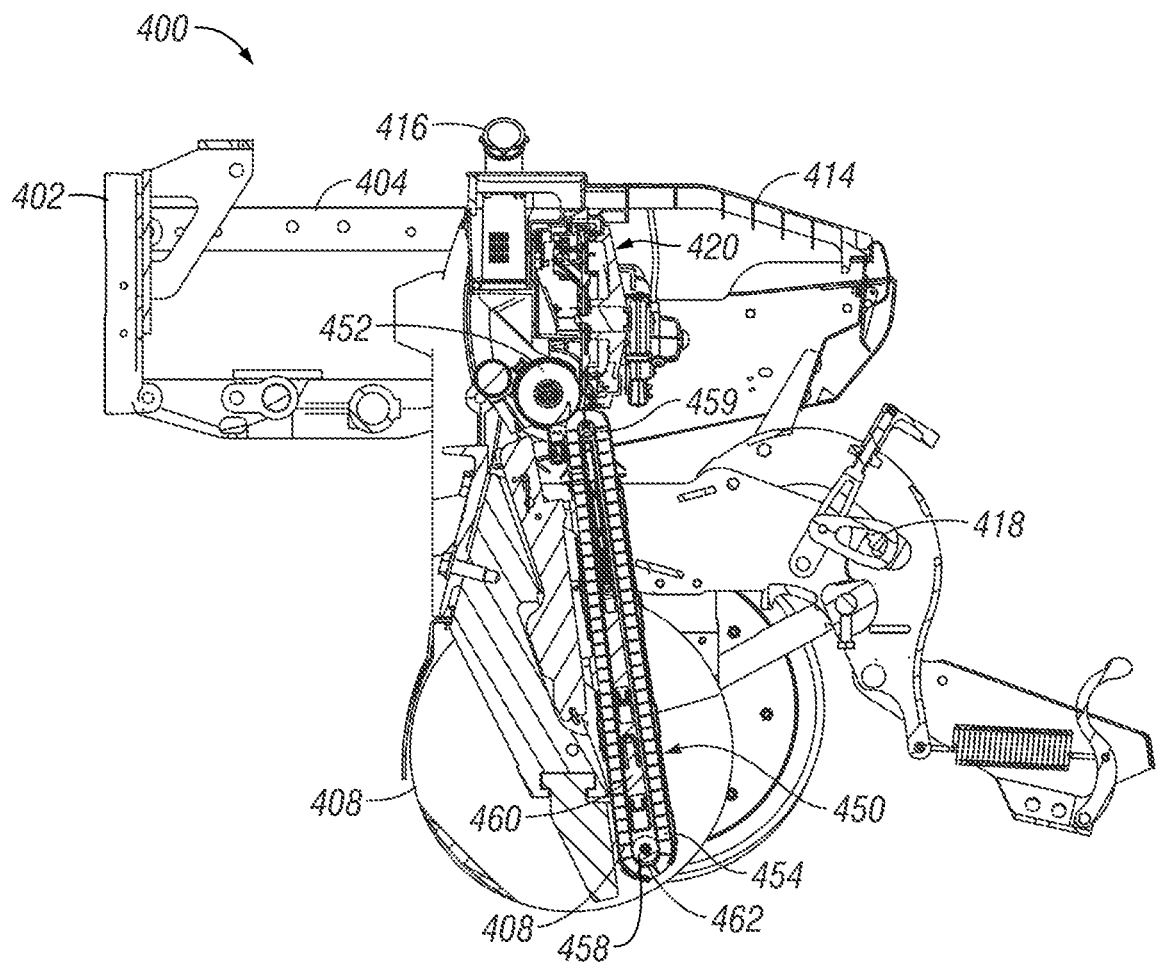
FIG. 26 is a side sectional view of the row unit of FIG. 23 according to line 26-26 of FIG. 24.
Figure 27:
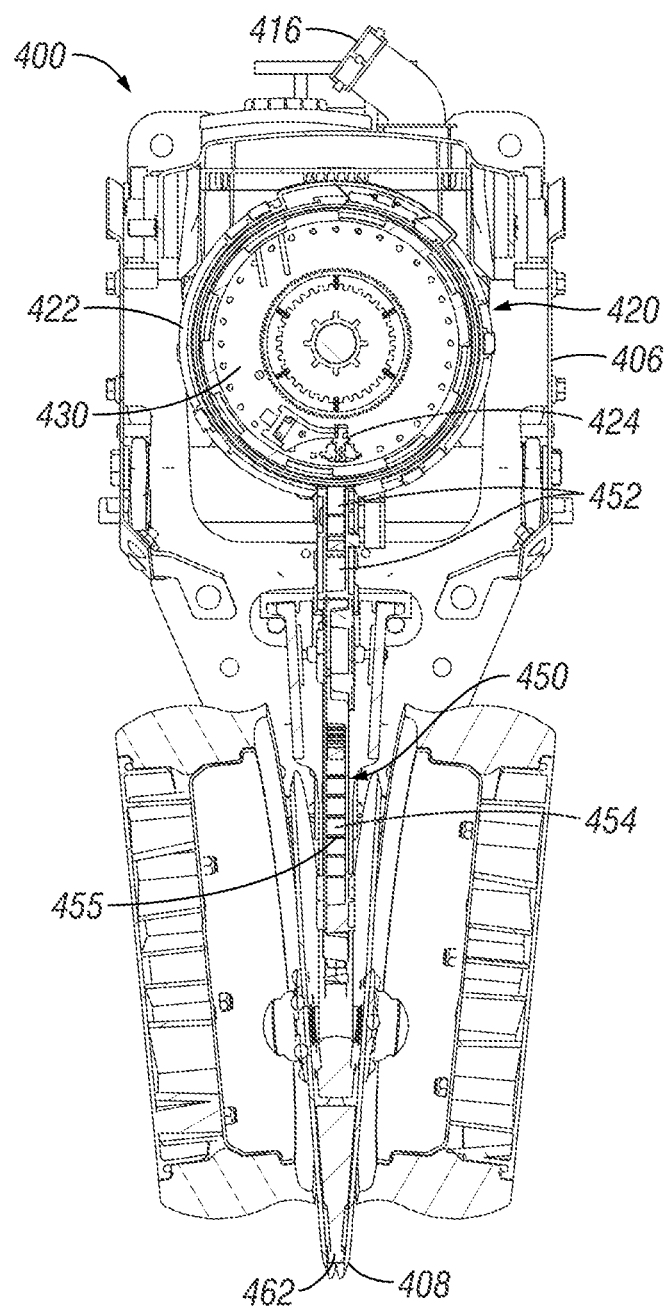
FIG. 27 rear sectional view of the row unit of FIG. 23 according to line 27-27 of FIG. 25.

FIGS. 26 and 27, which are sectional views of the row unit 400, show additional aspects of the invention, which include, in part, the seed meter 420 and the seed to ground delivery system 450. The seed meter 420 and the seed delivery system 450 are similar in nature to that shown and described with respect to FIGS. 13-22. The seed meter will receive seed via the conduit 416 and temporarily store the seed at a seed pool 423 within a housing 422 of the meter 420. A disc 430 rotating within the housing 422 will interact with the seed in the pool 423, and a pressure differential at seed apertures in and through the disc will cause the seed to adhere at the apertures of the disc 430. It is noted that the entire second side of the seed disc 430 will be pressurized, and there will be no areas where the pressure difference is cut-off. The seed will travel on the disc 430 until it is dislodged by a combination of a seed knock-off 424 and a brush wheel 452, which are on opposites side of the seed disc 430, as will be disclosed herein. The seed will be transported via the brush wheel 452 at a higher rotational velocity than the rotating speed of the disc 430 to a point where the seed will be delivered towards a belt 454. The belt 454 includes spaced flights 455, which will provide a controlled delivery towards a release point 462. The belt 454 will have a velocity that is synced with the ground speed at the row unit 400 such that the seed will be released from the belt 454 and delivery system 450 with a horizontal velocity component that is equal to said ground speed in an opposite direction so that the seed is release with zero relative velocity, which will mitigate bounce, roll, or other movement of the seed when it contacts the ground.

FIG. 27 is a rear sectional view of the row unit 400 showing the second or pressurized side of the seed disc with the seed knock-off member 424. As shown, the knock-off member 424 is a rotating member with spikes or other elongations extending outward and spaced to substantially align with corresponding seed apertures of the seed disc. This would make it such that the elongations extend at least partially into the seed apertures to interact with the seed to dislodge the seed thereat to aid in the removal of the seed by the brush wheel 452 that is rotating substantially transversely to the rotating seed disc.

FIG. 27 also shows the location of the belt 454 relative to the opening wheels 408. The belt housing 456 will be at least partially between the opening wheels 408 to place a seed dispersed therefrom in the created furrow as close to creation as can be to mitigate the movement of the seed dropped therein before the furrow is closed. FIG. 27 also shows how the seed meter 420 will be positioned substantially perpendicular to the direction of travel of the row unit 400, while the brush wheel 452 and the belt 454 will be substantially aligned with the direction of travel.

Figure 28:
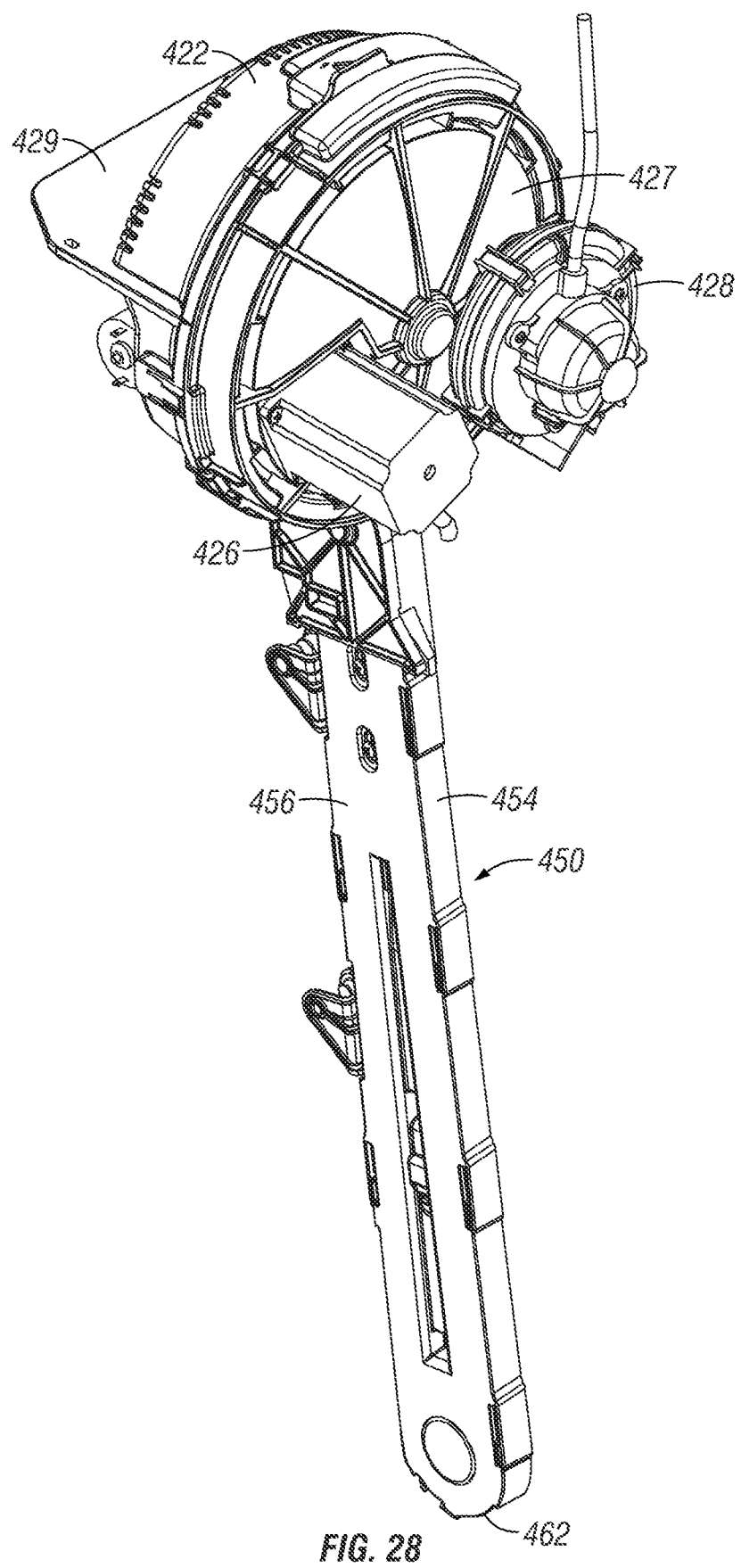
FIG. 28 is a perspective view of a seed meter and seed delivery system according to aspects of the invention.
Figure 29:
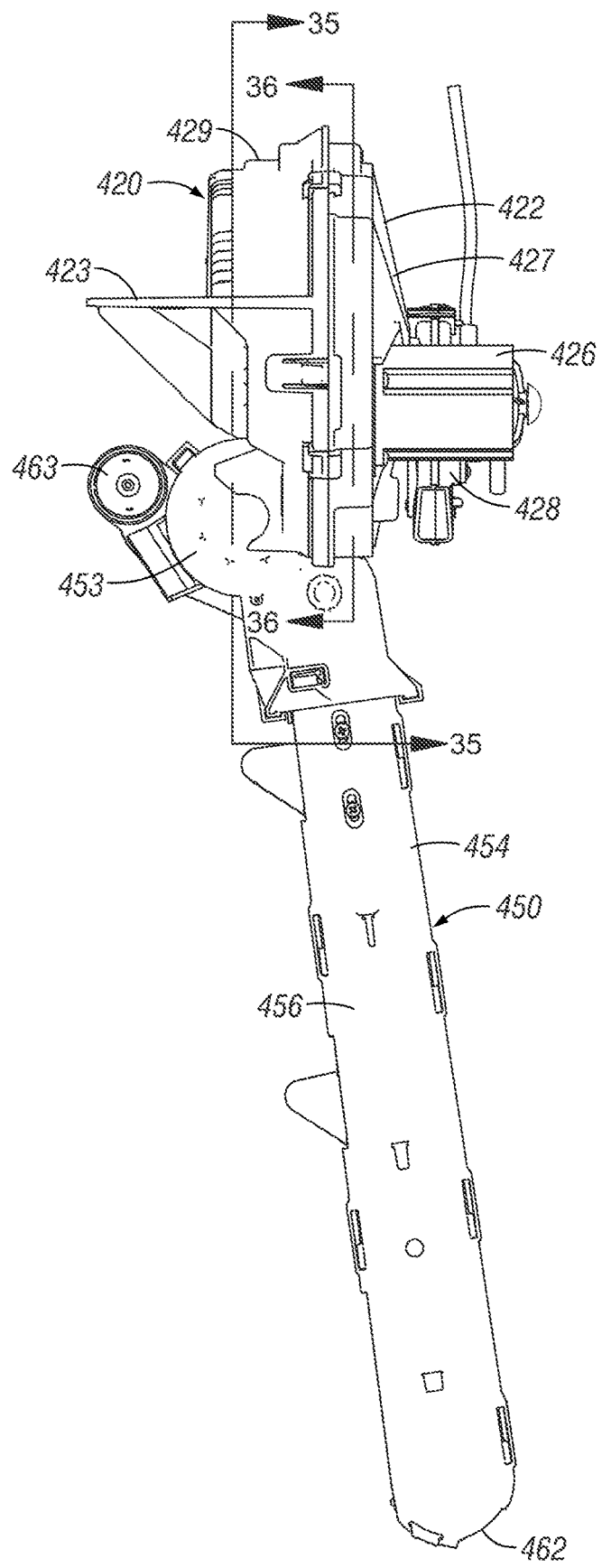
FIG. 29 is side elevation view of the seed meter and seed delivery system of FIG. 28.
Figure 32:
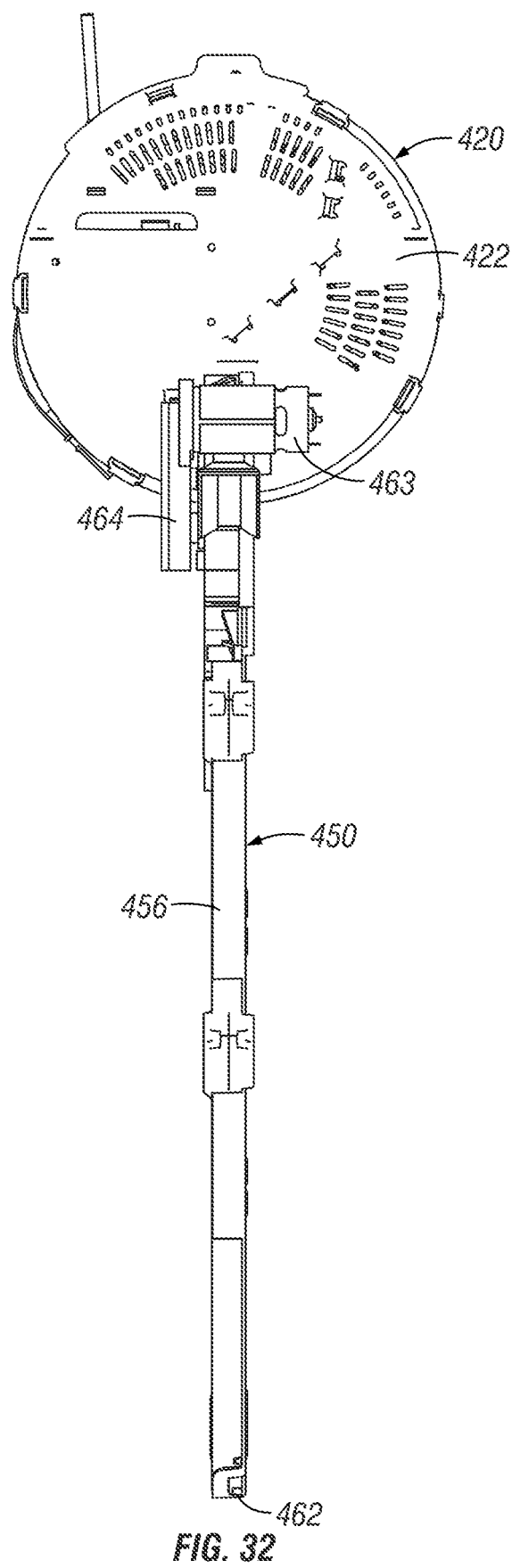
FIG. 32 is a front view of the seed meter and seed delivery system of FIG. 28.
Figure 33:
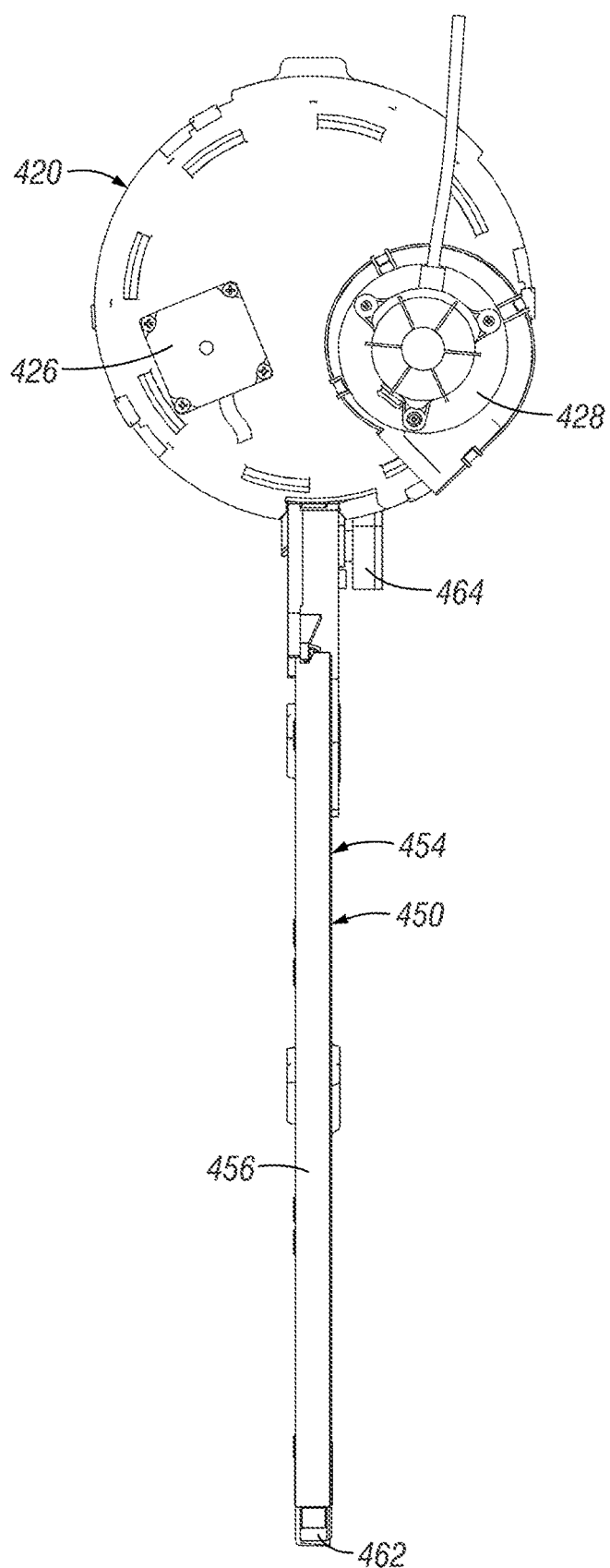
FIG. 33 is a rear view of the seed meter and seed delivery system of FIG. 28.

FIGS. 28-29, as well as FIGS. 32-33, show various views of the seed meter 420 and the seed to ground delivery system 450, including the housings thereof. The seed meter 420 includes a disc 430 within a housing 422. The housing 422 may be a one-piece or multi-component housing in which the components are attached to one another, such as by snapping together, clasping, of otherwise affixing temporarily or selectively to one another. For example, in some embodiments, the housing 422 may include a pressure side 427 and a seed side 429. The pressure side 427 can include a connection for a pressure source, such as a vacuum, fan, blower, or the like. In the embodiments shown, the pressure source is a dedicated or otherwise integrated fan 428 that is positioned on the housing 422. The integration of the fan 428 at the seed meter provide numerous advantages, such as individual control for each seed meter of each row unit, greater efficiency, reduction of hoses/conduits for the planter, etc. Additional advantages and description of integrating a fan 428 to the meter housing 422 are shown and described in U.S. Pat. No. 9,763,380, which is hereby incorporated by reference in its entirety. The fan 428 can include a rotating member rotating at a high speed to create a pressure differential at the seed meter, and can convey the pressure to within the housing via a cutout, aperture, conduit, or the like. The fan 428 can be electrically connected to a source that provides electric power thereto in order to operate. Additionally, the fan can be connected to a processing unit, central processor, or other computing member to provide commands and/or control of the fan at each of the seed meters at each of the row units.

Also shown at the pressure side of the housing 422 is an electric motor 426. The motor 426 is used to provide rotational power to the seed disc 430 inside the housing. As will be understood, the disc 430 includes gear teeth 435 that will interact with an output shaft of the motor 426, wherein rotation of the output shaft will result in corresponding rotating of the disc. The electric motor 426 will also be connected to the central processor/control to provide a rotational velocity that is based, in part, on the seed type, population input, ground speed at the row unit, spacing, and other inputs related to planting. The inputs could be inputted to, reviewed, and updated via a central processor and display, such as is disclosed in co-owned PCT Application No. PCT/US2017/064246, which is hereby incorporated by reference in its entirety.

Opposite the pressure side 427 of the housing 422 is the seed side 429. The seed side includes a pool 423 or a passage for seed to be delivered to a pool for the seed meter. The housing members may comprise a rigid polymer such as plastic or the like, and can be configured to reduce static energy of the components, such as by including one or more grounds.

Positioned adjacent to and operatively connected to the seed meter housing 422 is the seed to ground system 450 and components. The components include the brush wheel 452 and housing 453 thereof. As will be understood, the brush wheel comprises a plurality of bristles extending from an axis that are pliable and resilient to be deformed to receive a seed to transfer the seed from the seed disc 430 to the belt 454. The housing 453 can also be a rigid material, such as a plastic.

Attached to and extending from the brush wheel housing 453 is the housing 456 for the belt 454. The belt housing 456 is an elongated member, comprising a rigid material, that is used to house the belt 454 and other components therein. The belt housing 456 can be unitary or multi-component, in which the components are attached to another to allow selective access to the interior thereof. An opening 462 is positioned at or near the bottom of the housing 456 to coincide with the release point wherein the seed is released from the belt and directed towards the furrow for planting.

While not explicitly shown, one or more sensors will be associated with the housing 456 of the belt 454 to sense the occurrence of seed passing therethrough, the speed of the belt, and other aspects of the movement of the belt and/or seed within the housing 456. The sensor(s) can be placed generally anywhere along or on the belt housing 456 in which the sensor is able to sense the belt and/or seed moving therein.

Additional components shown in the figures include a motor 463 and gearbox 464. The motor 463 is an electrical motor, such as an DC brushless motor. The motor 463 is used to provide power to rotate the brush wheel 452 and the belt 454. The power is transferred from an output shaft of the motor to the brush wheel 452 and belt 454 via the gearbox 464. The gearbox 464 includes gears to receive and transfer the rotational output of the motor 463. The gears may be numbered to receive direct input from the motor or to receive translated movement from a corresponding gear, and can be sized and spaced to generate a desired output (i.e., rotational velocity), as is known. The motor 463 can be connected to the central processor or controller to provide for a speed to the system 450 based upon the ground speed, population, and other inputs, and can be set such that the seed being released at the release point 462 can have the horizontal component that is substantially equal to and opposite of the ground speed such that the seed experiences zero net velocity. The gears and motor will provide such a speed output.

Figure 30:
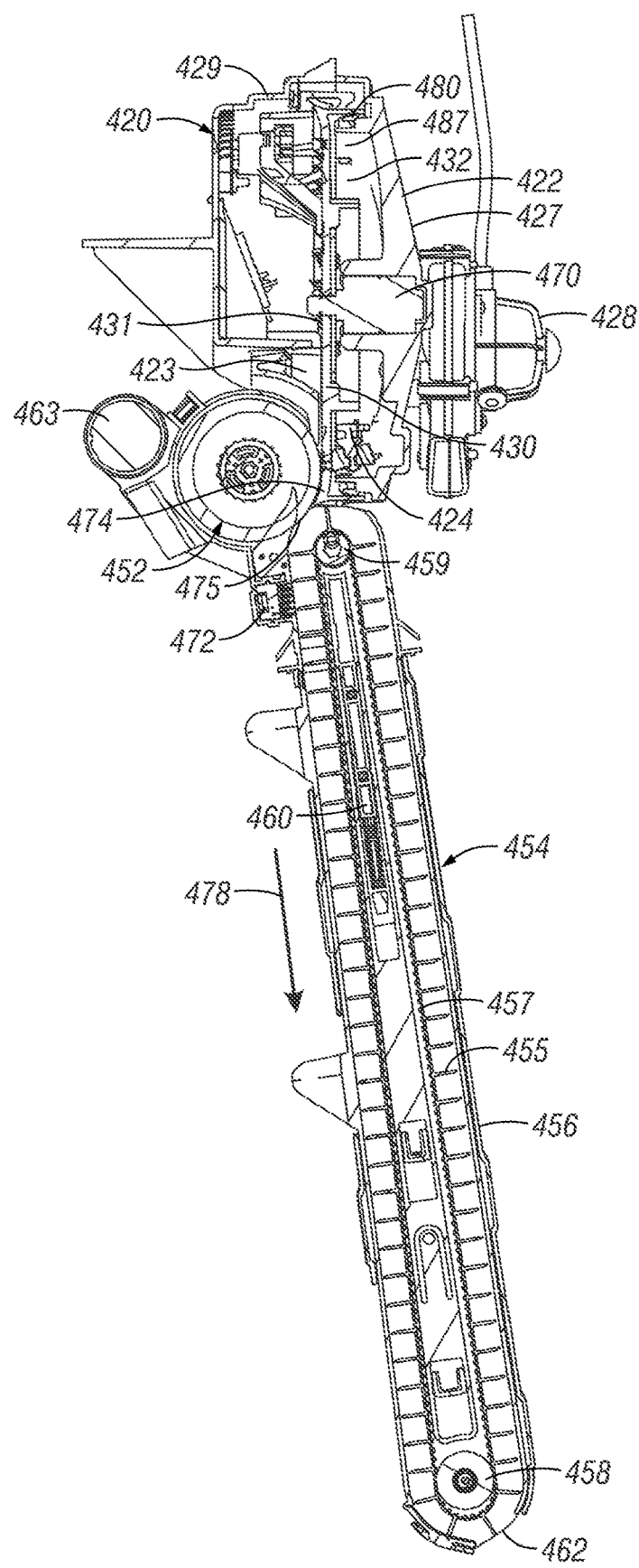
FIG. 30 is a sectional view of the seed meter and seed delivery system of FIG. 28.
Figure 31:
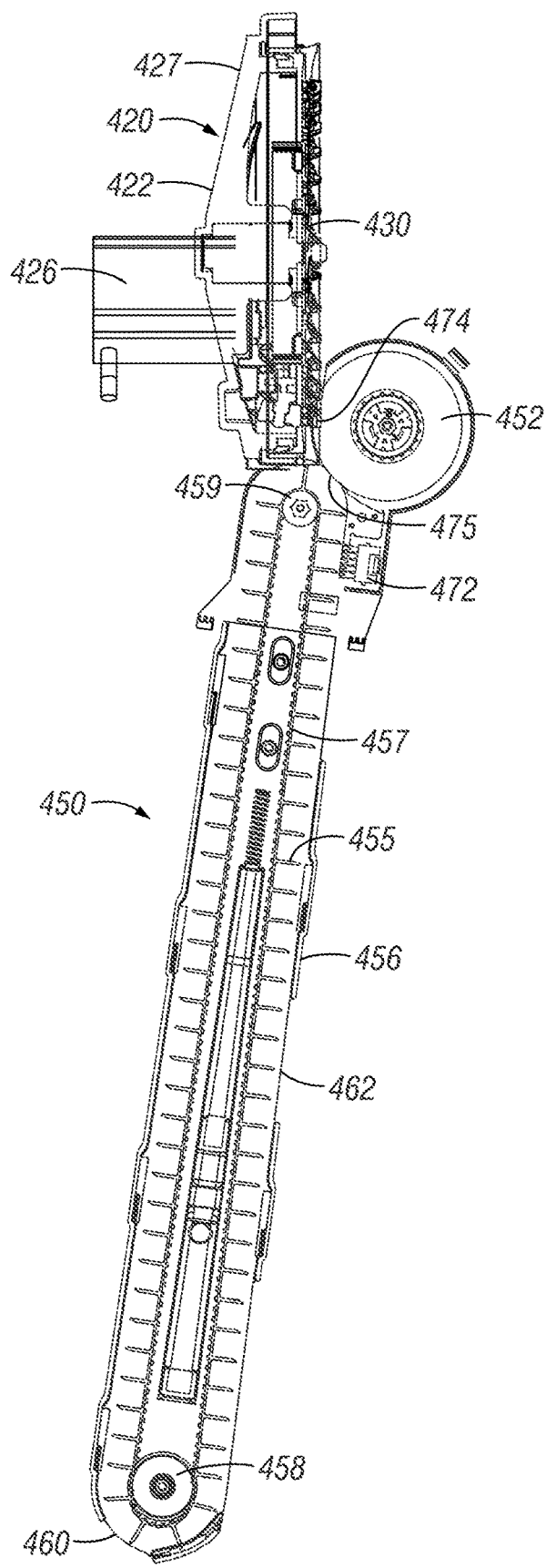
FIG. 31 is an opposite sectional view of FIG. 30.

FIGS. 30 and 31 are opposite sectional views of the seed meter 420 and the seed delivery system 450 as shown and described. As shown in the figures, the seed meter 420 includes additional components, such as a bearing member 470 to aid in the rotation of the disc 430 within the housing. The disc 430 is also shown to have a first side 431, which may also be referred to as the seed side, and a second side 432, which also may be referred to as the vacuum or pressurized side. The seed side 431 is the side that engages and interacts with seed, and the pressurized side 432 is the side that is being pressurized to create the pressure differential at the seed apertures 434 in and through the disc 430. As will be understood, the disc 430 includes a generally planar inner portion 438 and a curved outer portion 439. The apertures 434 are positioned substantially at the intersection of the inner and outer portions, where the disc begins to curve. The curvature of the outer portion 439 of the disc 430 coincides generally with the brush wheel 452 such that the brush wheel is able to rotate along with the curvature of the profile of the disc. The point where the brush wheel 452 and the disc 430 interact is shown by numeral 474 in the figures.

As disclosed, the brush wheel 452 includes a plurality of outwardly extending bristles that are used to engage a seed from the disc and to speed up and transfer the seed to the belt 454. This occurs generally at the location 475 as shown in the figures.

Additional elements of the belt 454 include, but are not limited to, a lower roller 458 and an upper roller 459. The belt 454 comprises an inner surface 457 with flights 455 spaced and extending from the inner surface 457. The inner surface 457 extends around the upper and lower rollers 458, 459, and can be tensioned by a tensioner 460. The upper and/or lower roller can be connected to the gearbox 464 and motor 463 to provide rotational velocity to the belt 454, which can correspond with the ground speed of the row unit 400 to provide population selected spacing and planting.

Still further, the sensor 472 can be associated with the belt 454, such as at the belt housing 456, to sense the movement of the belt and to sense seed characteristics as the belt moves. For example, the sensor can be used to determine the presence of a seed, the proximity of one seed to a subsequent seed, multiples, skips, or any other information that corresponds to planting. The sensor can provide feedback to the processor, controls, and/or user to determine the efficiency and accuracy of the planting system to determine if errors are occurring so that they can be troubleshooted and corrected to plant the seeds with the spacing and population desired. Additional sensors may also be positioned along the belt, including on the opposite side to ensure that the seed has been released from the belt and is not continuing to travel with the belt.

Operation and travel of the seed can be shown best with regard to FIG. 30. Seed is provided to the seed meter 420 and pooled at the seed pool 423. A disc 430 rotating in the meter 420 is pressurized to create a pressure differential at the seed apertures 434 in and through the disc. The seed is therefore adhered to an aperture 434 as the aperture passes through the pool 423. The disc 430 rotates through a singulator 500 to ensure that a single seed is positioned at the aperture 434. The disc 430 continues rotation towards the brush wheel 452, which is located at an approximately 6 o'clock position 474 of the meter 420. At or near this position, on the second side 432 of the disc 430 is a knock-off member 424 that rotates and includes elongations extending at least partially into the apertures 434. The knock-off member 424 aids in dislodging the seed from the aperture 434 at or near the location of the brush wheel 452 to aid in the removal and transfer of the seed from the disc 430 to the brush wheel 452. The brush wheel 452 at least partially captures, grabs, or otherwise moves the seed from the disc 430 and towards the belt 454. The brush wheel 452 is moving at a much higher rotational speed (e.g., up to 10 times faster) than the disc 430 to begin corresponding to the ground speed of the row unit and/or planter. The bristles of the brush wheel 452 aid in moving the seed.

The brush wheel 452 moves the seed towards the belt 454, and transfers the seed to the belt at an approximate 5 o'clock position as shown in FIG. 30. Thus, the brush wheel does not move the seed very far. The seed is then transferred to a location between adjacent flights 455 of the belt 454 at the transfer point 475, where the belt 454 begins moving the seed. The belt 454 is being moved at a speed to correspond with the ground speed, and is controlled by the motor 463, gearbox 464, and rollers 458, 459. The seed will pass at least one sensor 472 to acquire information about the movement before continuing along the elongated path indicated by the arrow 478 in FIG. 30. The movement will continue towards the release point 462 at or near the bottom of the elongated belt 454. The seed is released from the belt 454 with a horizontal velocity component that is substantially equal and opposite in direction to the travel of the row unit 400 to drop the seed with zero relative velocity, which will mitigate bounce, roll, or other movement of the seed in the furrow. Thus, the seed has been planted using the seed meter 420 and seed delivery system 450 of the embodiments.

Figure 34:
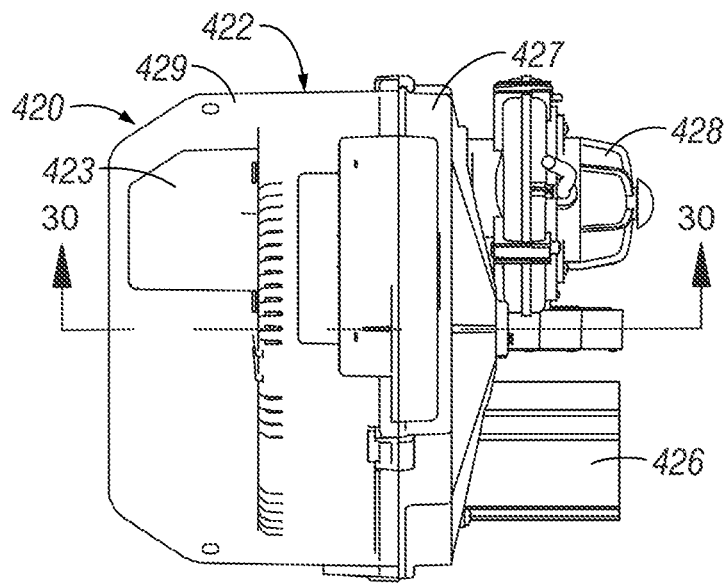
FIG. 34 is a top plan view of the seed meter and seed delivery system of FIG. 28.
Figures 35, 36:
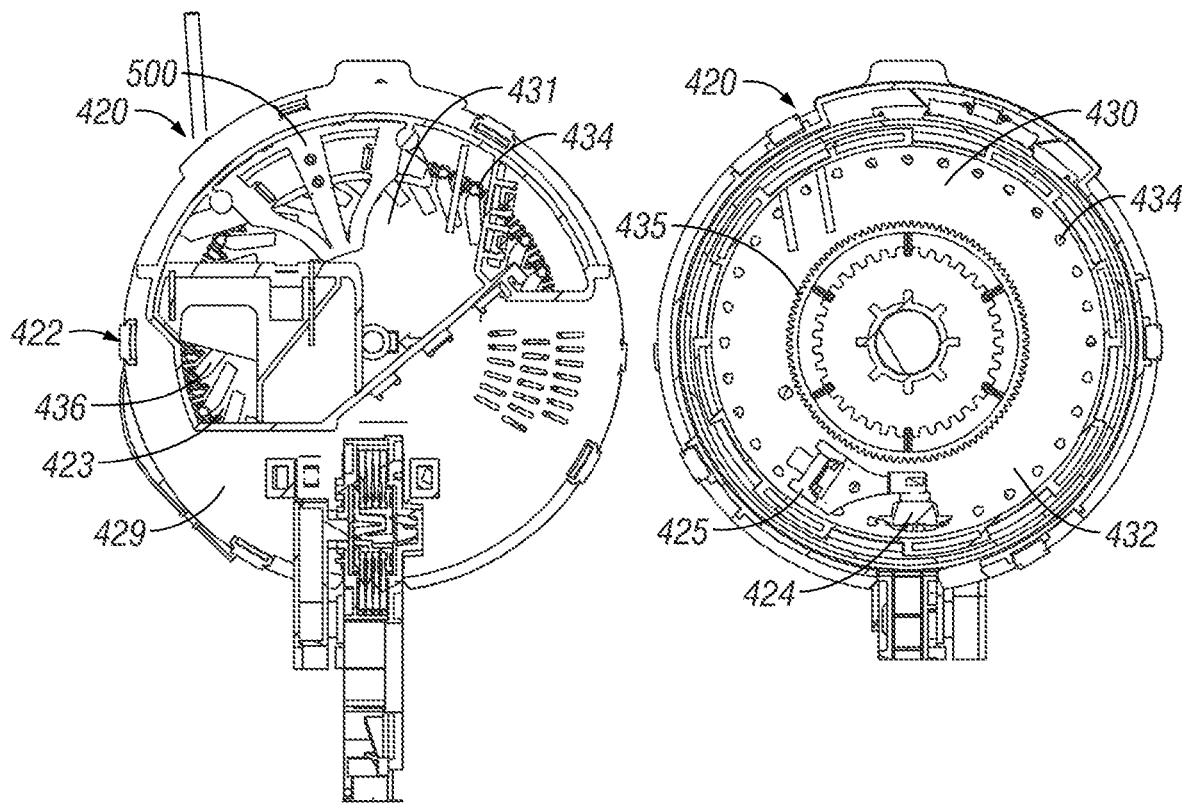
FIG. 35 is a sectional view taken along line 35-35 of FIG. 29.
FIG. 36 is a sectional view taken along line 36-36 of FIG. 29.

FIGS. 34-36 are additional views of the seed meter 420. FIG. 35 is a partial sectional view that shows portions of the first side 431 of the seed disc 430. As will be understood, the disc 430 includes a plurality of radially spaced apertures 434 creating a seed path. The apertures extend in and through the disc 430. Adjacent to and in angular relation to the apertures are corresponding seed channels or pockets 436. The channels 436 engage the seed in the seed pool 423 (location shown in FIG. 35 to be at an approximate 8 o'clock position) to agitate and urge the seeds towards the apertures. The channels are indents in the face of the first side 431 of the disc 430, but do not extend through the disc 430. Also shown in FIG. 35 is a singulator 500, which will be disclosed in more detail herein. The singulator 500 is used to singulate seeds, i.e., ensure that a single seed is positioned at each aperture 434.

FIG. 36 is an opposite view of FIG. 35, with the housing member 427 removed to show the interior of the housing 422. The figure shows the second or pressurized side 432 of the seed disc 430, which includes the apertures 434 that extend through the disc. Also shown in FIG. 36 is the gear teeth 435 that engage and interact with the output shaft of the motor 426 to provide rotation to the disc 430. The gear teeth 435 are shown to be positioned radially from the axis of the disc 430 between the axis and the outer edge of the disc. The teeth 435 are outwardly facing (opposite the axis). Thus, the shaft will not interfere with or get in the way of the seed path or other components of the meter 420. The knock-off member (also referred to as an ejector) 424 is also shown in the figure. The ejector 424 is a rolling type ejector wheel that aids in seed removal from the disc. As disclosed, the knock-off member 424 includes a rotatable member with outwardly extending portions that correspond with the seed apertures 434. The rotating member is connected to the housing 422 via a hinge 425 to allow for axial movement of the knock-off member 424 relative to the disc 430. The member 424 can be biased towards the disc as well.

Figure 37:
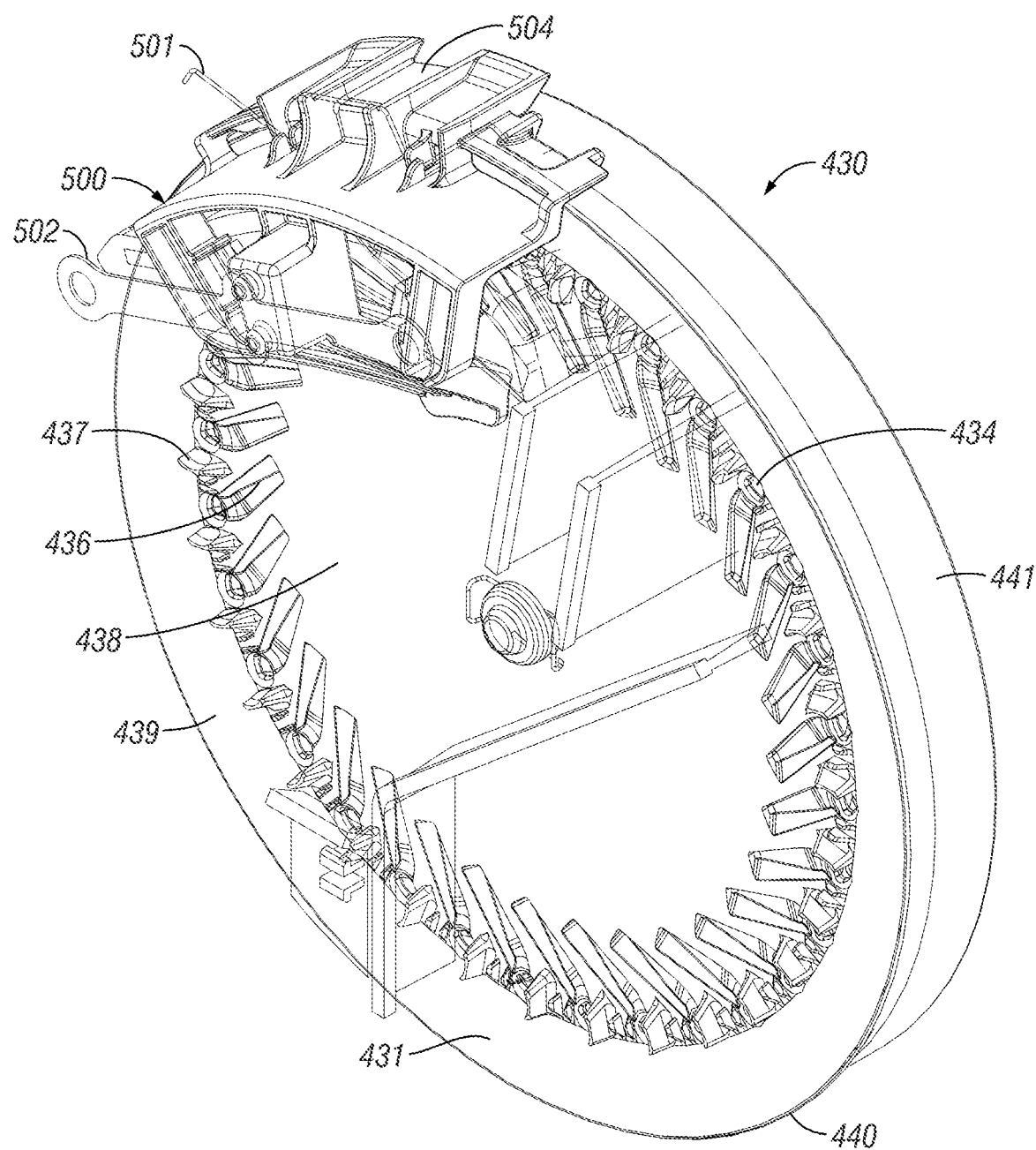
FIG. 37 is a perspective view of a seed disc and singulator according to aspects of the invention.
Figure 38:
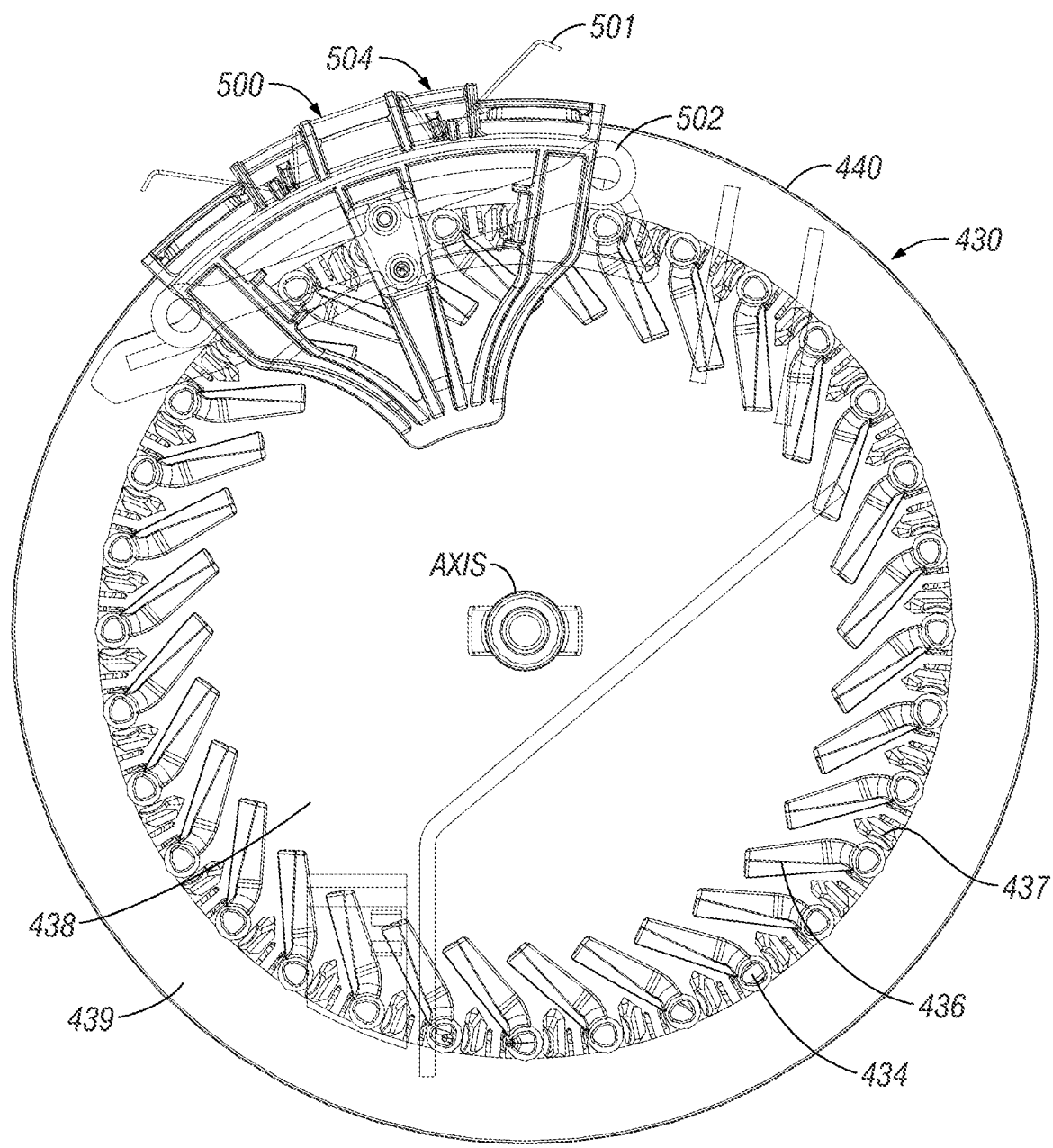
FIG. 38 is an elevation view of the seed disc and singulator of FIG. 37.

FIGS. 37 and 38 are views of the seed disc 430, and in particular, the first or seed side 431 of the seed disc 430. As disclosed, the seed disc 430 includes an axis and a plurality of seed apertures/cells 434 radially spaced from the axis and forming a seed path. The apertures 434 extend in and through the seed disc 430. Adjacent to the apertures 434 are corresponding seed channels 436, that are angled and extend partially into the disc. The channels 436 are included to agitate and to urge the seed from the seed pool towards the seed apertures 434. The channels 436 may have an angled front wall and internal end wall, and a rear wall that is substantially normal to the face of the disc. The outer end wall near the aperture may also be angled/beveled and terminates generally at the aperture. The shape of the channel is angled relative to a line of radius extending from the axis and towards an aperture, resulting in an angle that is ahead of the line of radius. In between the apertures 434 are outwardly extending flaps or paddles 437. The paddles 437 extend away from the disc 430 and separate the apertures. The paddles are spaced generally such that the brush wheel 452 is able to fit between subsequent paddles to remove a seed that is positioned between the paddles. However, the paddles 437 need not be included in all embodiments.

Figure 39:
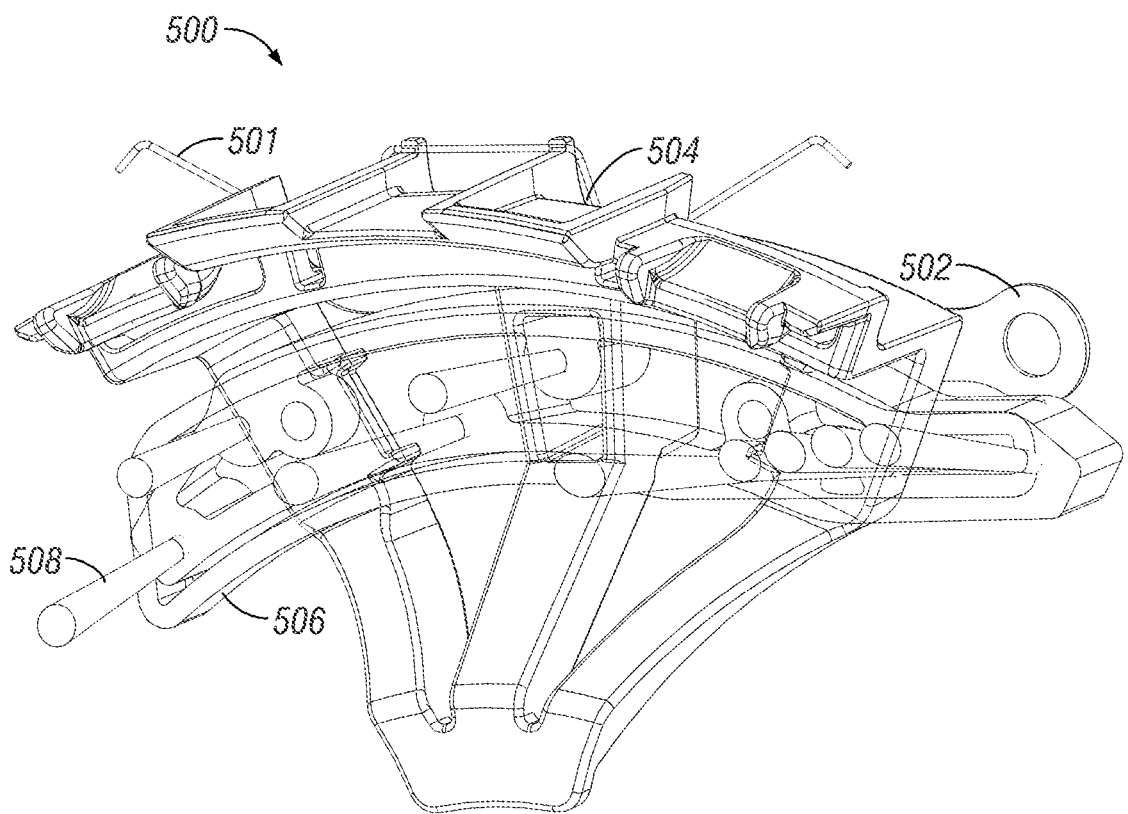
FIG. 39 is a perspective view of a singulator.

Also shown in the figures, and in more detail in FIG. 39, is a singulator 500. As noted, the singulator 500 is configured to singulate seed on the disc 430 so that a single seed is positioned at each aperture 434. The singulator 500 is positioned to attached to the housing 422 and "ride" along an outer edge 440 of the disc 430. The singulator has a housing or body 504 that includes one or more surfaces for moving along the outer edge 440. However, the singulator may or may not actually touch the disc 430. The singulator 500 is attached to the housing 422 via member 502, which may be spring steel to bias the singulator 500 away from the housing and towards the disc 430 in an axial direction. In addition, a biasing member 501 is included in the form of a spring wire to allow the singulator to float in a radial direction, which biasing towards the axis of the disc 430. The singulator further includes a blade 506 extending downward from the body 504. A singulating element 508 extends from the blade 506. In the figures, the singulating element is in the form of a plurality of offset and spaced brushes, which are configured to face the seed side 431 of the disc 430 about the seed path to "brush" off double seeds that may adhere to a single aperture. The brushes could be replaced with blade members, as disclosed in U.S. Pat. No. 9,277,688, which is hereby incorporated by reference in its entirety.

Additionally, as shown in FIG. 37 and disclosed herein, the disc 430 includes an inner portion 438 that is substantially planar, and an outer portion 439 that is curved. The curved outer portion 439 begins approximately the location of the seed apertures 434 and includes a curvature similar in nature to the outer profile of the brush wheel 452. The curved outer portion 439 terminates at an edge 440. It is also noted that the figure shows that the outer profile/edge 440 extends outward of the outer edge 441 of the second side 432 of the disc 430.

Figure 40:
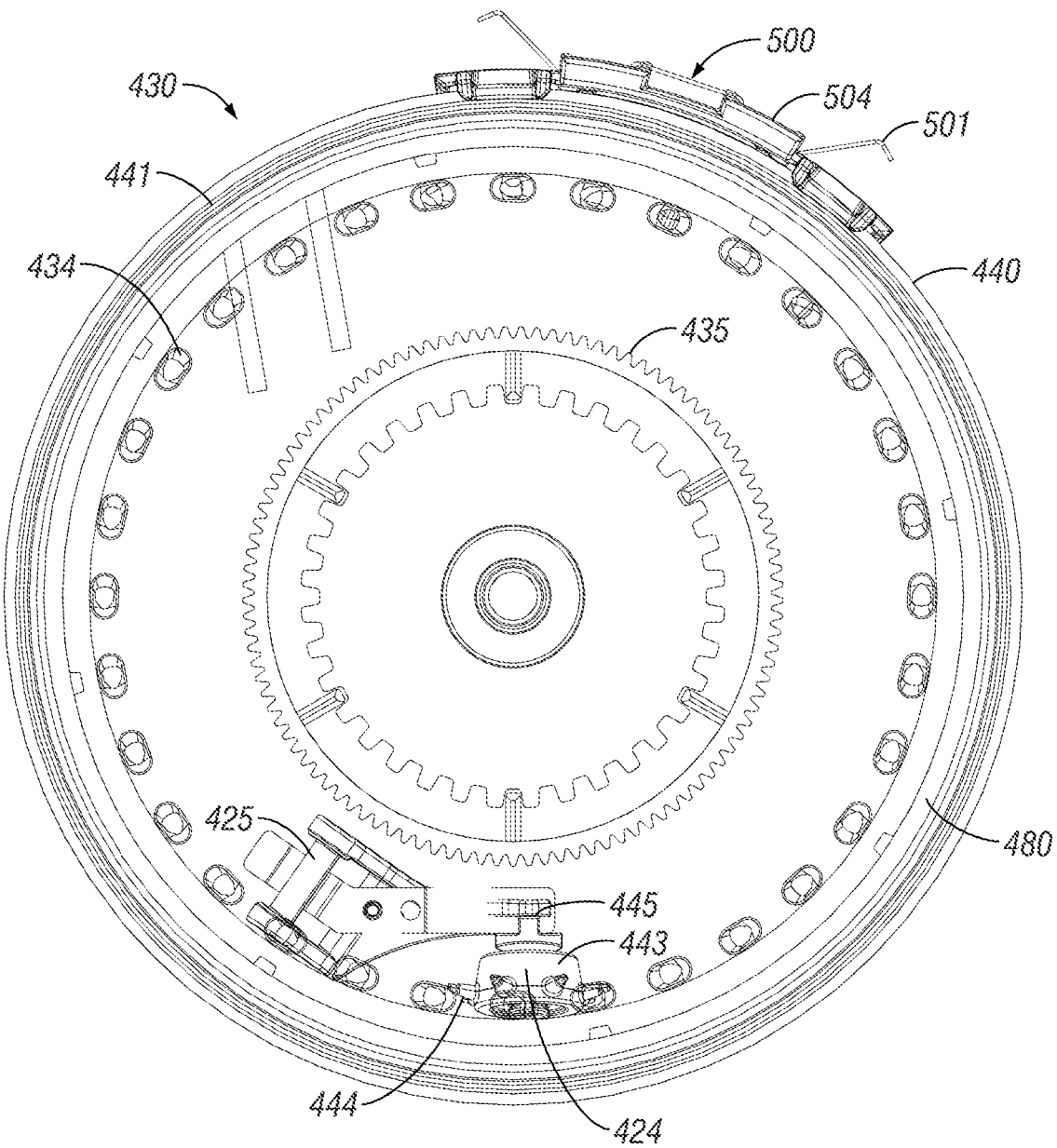
FIG. 40 is a rear view of a seed disc.

FIG. 40 is a view of the second side 432 of the disc 430. As shown, the apertures 434 extend through the disc 430, and have a profile on the second side in which the aperture is larger on the second side and narrows towards the first side of the disc. This allows the pressure to be increased when felt at the first side 431 of the disc 430. The gear teeth 435 are also shown in greater detail in FIG. 40, as is the knock-off or ejector member 424. As noted, the ejector 424 is a rolling type that includes a rotatable body 443 with extensions 444 radially spaced therefrom. The spacing of the extensions 444 coincide with the apertures 434. The body 443 is connected to an arm 445 that is hingeably connected to the housing 422 at a hinge 425. This allows for biasing of the ejector 424 towards the disc 430, while allowing for axial movement of the same, which can be needed if obstructions are included, or if the disc 430 becomes warped or otherwise deformed.

The figure also shows the singulator 500 attached to ride along the edge 440 of the disc 430.

Figure 41:
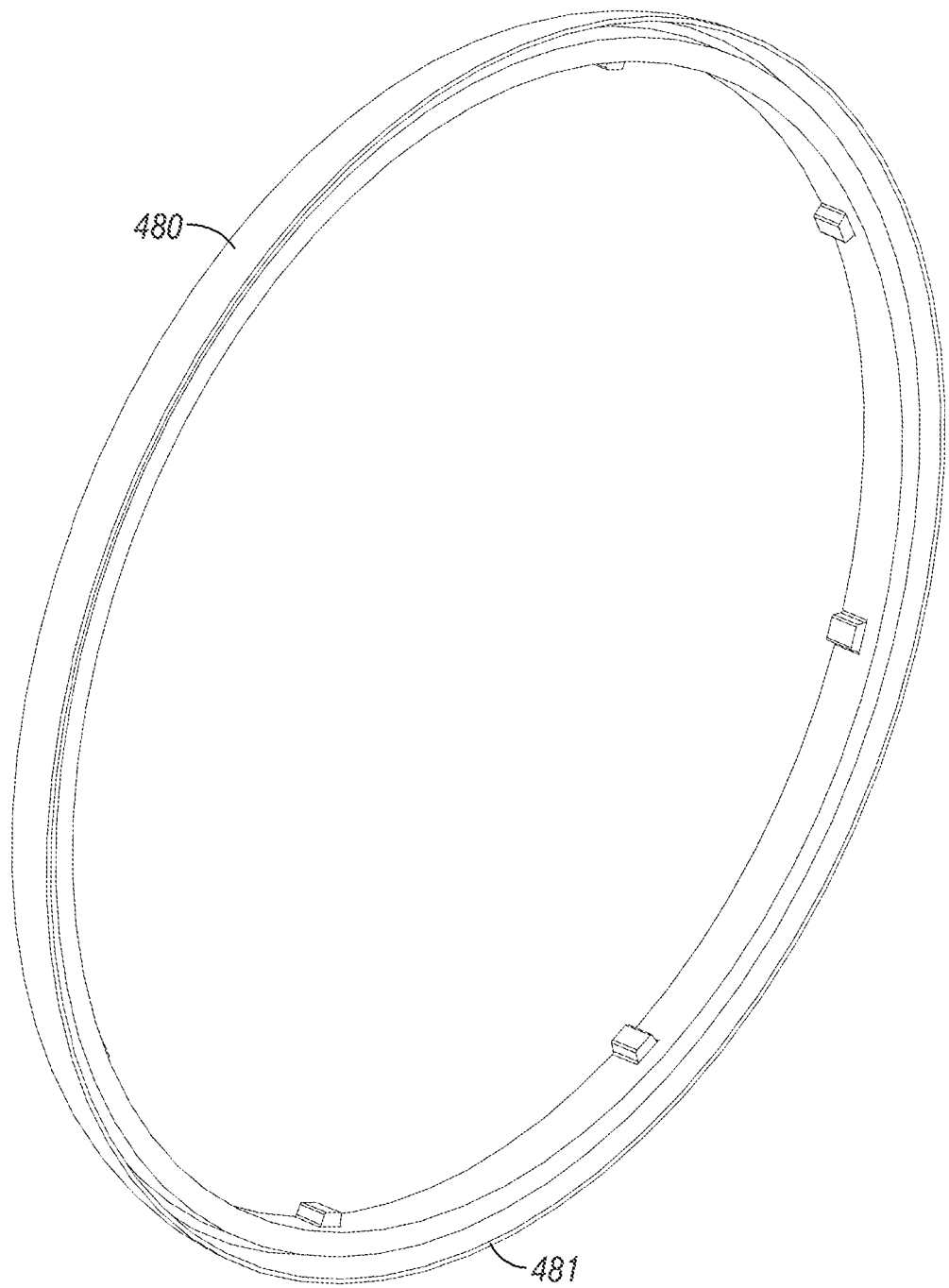
FIG. 41 is a perspective view of a seal for use with a seed meter.
Figure 42:
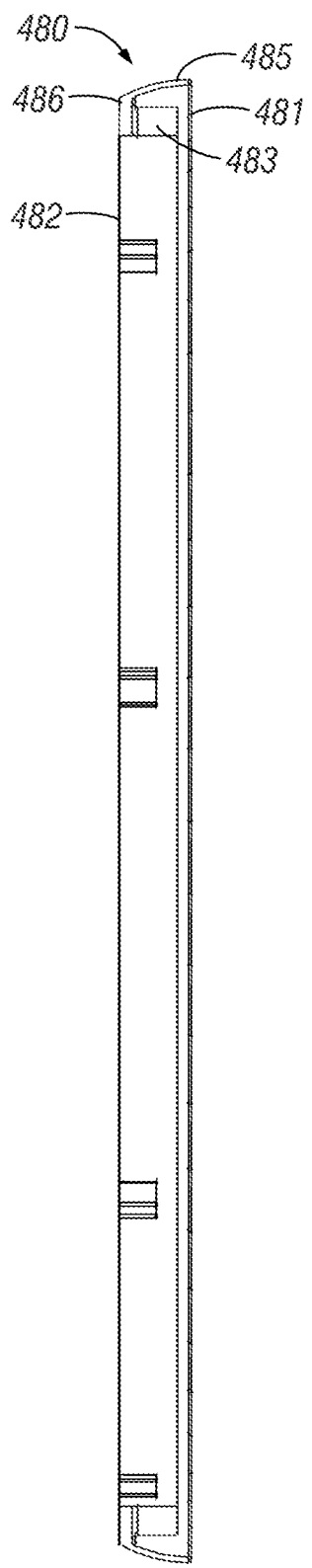
FIG. 42 is a sectional view of the seal of FIG. 41.

In addition, the figure, along with FIGS. 41-42, disclose the inclusion and use of a seal or gasket 480 on the second side 432 of the disc 430. The seal or gasket 480 is used to create a fully pressurized zone on the second side of the disc 430, making it so the area inside the seal or gasket 480, which includes the entirety of the seed path, is pressurized. This ensures that all of the apertures 434 will be under pressure at all times of operation of the seed meter. The seal is housed in a notch or compartment 487 (see, e.g., FIG. 30) that is formed between a portion of the housing 422 and an interior of the outer edge or wall 441 of the disc 430.

The seal or gasket 480 comprises a resilient, pliable, or otherwise flexible material (such as a rubber, silicone, or like material) that will close off the portion of the disc 430 radially internal of the seal 480 to create a pressurized zone. To aid in creating such a zone, the seal 480 includes a unique design, as shown in FIG. 42. The seal 480 includes a base portion 483 and a lip 485 extending therefrom. The lip 485 is curved and extends generally alongside the base 483, and is connected at a hinge 486. The composition of the seal or gasket 480 and the use of the hinge 486 allows for the base 483 and the lip 485 to move relative to one another without breaking or fracturing. As the pressure is turned on and off, the seal will be acted upon and will deform to close off the edges 481, 482 on opposite sides, creating the closed off pressurized zone. For example, as the pressure acts on the seal, the lip 485 will be forced outwardly radially and the base 483 will be forced inwardly radially. The hinge 486 allows for the base 483 and lip 485 to move towards and away from one another.

Additional changes and/or variations may be made to the systems as shown and described. For example, a seed meter system, as shown and described in U.S. application Ser. No. 15/343,342, which is hereby incorporated by reference in its entirety, could be used in place of and with any of the seed delivery systems shown and described herein. The brush wheel and belt could receive the seed from the seed meter of the '342 application and control the delivery at the speed desired to match the ground speed of the planter and/or row unit.

Furthermore, it should be noted that any of the components, embodiments, aspects, systems, or portions of any of the figures as shown and/or described could be used with any of the other the components, embodiments, aspects, systems, or portions of any of the figures as shown and/or described to result in additional embodiments. Those skilled in the art would readily understand and know, without undue testing, to replace the components based upon the information disclosed herein. This includes, but is not limited to, the type of pressure, the number of discs of a seed meter, the number of seed meters of a row unit, the use of sensors, the positioning of the meters and/or delivery systems relative to the direction of travel of the planter, the source of pressure (single source with hoses or integral), the source of motor, use of downforce, etc.

The embodiments and aspects of the invention as shown and described provide numerous advantages. The controlled nature of the delivery of seed from a seed meter to the furrow provides for increased accuracy and/or efficiency in spacing of seeds planted, especially with regard to higher speed planting. It is noted that high speed planting is recognized as planting at speeds generally above 8-miles per hour, and may be considered generally above 8-MPH and between 8-15 MPH (approximately 12.9-24.1 Kilometers per hour). However, this is not to be limiting, and high speed planting may be defined as being outside of this range. The high speed ability to plant allows farmers to plant their crop in reduced time and to plant within a preferred window of time based, at least in part, by the geographical climate and conditions of the location of planting. The aspects disclosed will allow for such high speed planting, while maintaining a high rate of singulation and planting efficiency and accuracy, in terms of ideal spacing and population of crop planting by the systems provided.

Thus, various configurations of seed delivery systems have been shown and described. It should be appreciated that the systems shown and described are for exemplary purposes, and the invention of a controlled system for delivering seed from a singulating seed meter to the ground to provide for consistent and equidistant spacing of the seed in the ground has thus been provided. It is to be contemplated that numerous variations, changes, and otherwise, which are obvious to those skilled in the art are to be considered part of the present invention.

What is claimed is:

1. An agricultural planting implement, comprising:
   a plurality of row units, wherein each row unit of the plurality includes:
      a seed meter with a seed exit, said seed meter including a seed disc having a plurality of seed apertures radially spaced to form a seed path and a curved portion radially external the seed path; and
      a seed conveyor in communication with the seed meter to receive seed from the seed meter, wherein the seed conveyor is adapted to move the seed towards an ejection location proximate to a bottom of a furrow and is adapted to eject the seed with substantially no horizontal velocity relative to the bottom of the furrow.

2. The agricultural planting implement of claim 1, wherein the seed disc comprises a seed side and a pressurized side, and wherein the seed side is in communication with seed and the pressurized side in communication with a pressure source to create a pressure differential at the plurality of apertures.

3. The agricultural planting implement of claim 2, further comprising a seal positioned inside an outer edge of the pressurized side of the seed disc and extending circumferentially about the outer edge of the disc to create a fully pressurized zone within the seal on the pressurized side of the seed disc.

4. The agricultural planting implement of claim 1, further comprising a seed carrier in communication with the seed exit of the seed meter, said seed carrier receiving seed from the seed meter one seed at a time.

5. The agricultural planting implement of claim 4, wherein the seed conveyor is in communication with the seed carrier to receive seed from the seed carrier at a transfer location remote from the seed meter, and wherein the seed conveyor is adapted to move seed from the transfer location towards the ejection location.

6. The agricultural planting implement of claim 5, wherein the seed carrier is a brush wheel.

7. The agricultural planting implement of claim 6, wherein the seed conveyor comprises a flighted belt.

8. The agricultural planting implement of claim 7, wherein the brush wheel is adapted to release the seeds one at a time at the transfer location with a transfer velocity that substantially matches a velocity of the flighted belt.

9. The agricultural planting implement of claim 6, wherein:
   the seed disc rotates about a seed disc axis that is generally aligned with a direction of travel for the row unit; and
   the rotating brush rotates about a brush axis that is generally horizontal and transverse to the seed disc axis.

10. The agricultural planting implement of claim 9, wherein the brush axis is generally perpendicular to the seed disc axis.

11. A method of planting seeds using the agricultural implement of claim 1, comprising:
   moving the seed along the seed path of the seed disc of the seed meter;
   transferring the seed from the seed path to a rotating brush in communication with the curved portion of the seed disc;
   carrying the seed via the rotating brush to the seed exit;
   at the seed exit, transferring the seed from the rotating brush to the seed conveyor, wherein the seed conveyor moves the seed from the seed exit towards the furrow wherein the seed is ejected proximate to the furrow with a horizontal velocity component being approximately zero relative to the furrow.

12. The method of claim 11, wherein the seed disc rotates about a seed disc axis that is generally aligned with a direction of travel.

13. The method of claim 12, wherein the rotating brush rotates about a brush axis that is generally horizontal and transverse to the seed disc axis.

14. The method of claim 11, wherein the conveyor comprises a flighted belt within a conveyor cover.

15. The method of claim 14, further comprising controlling movement of the flighted belt such that the rotational speed of the flighted belt is substantially synchronized with the rotational speed of the rotating brush whereby seed exits the rotating brush with a speed that substantially matches the movement of the flighted belt.

16. The method of claim 11, further comprising sealing a pressurized side of the seed disc with a seal positioned inside an outer edge of the pressurized side of the seed disc and extending circumferentially about the outer edge of the disc to create a fully pressurized zone within the seal on the pressurized side of the seed disc.

17. The method of claim 11, further comprising singulating seed along the seed path with a seed singulator that is biased axially and radially towards the seed disc and that includes at least one singulating element.

* * * * *